(12) United States Patent
Itoh

(10) Patent No.: US 7,364,305 B2
(45) Date of Patent: Apr. 29, 2008

(54) PROJECTOR

(75) Inventor: Yoshitaka Itoh, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 292 days.

(21) Appl. No.: 11/123,123

(22) Filed: May 6, 2005

(65) Prior Publication Data

US 2005/0248736 A1 Nov. 10, 2005

(30) Foreign Application Priority Data

May 7, 2004 (JP) ............................. 2004-138279

(51) Int. Cl.
*G03B 21/14* (2006.01)
(52) U.S. Cl. ............................... 353/31; 353/34; 349/5
(58) Field of Classification Search ................. 353/31, 353/33, 34, 37; 349/5, 7, 8
See application file for complete search history.

(56) References Cited

U.S. PATENT DOCUMENTS

| 6,208,451 | B1 | 3/2001 | Itoh |
| 6,343,862 | B1 * | 2/2002 | Sawai et al. .................... 353/1 |
| 6,513,953 | B1 | 2/2003 | Itoh |
| 6,637,888 | B1 * | 10/2003 | Haven .......................... 353/31 |
| 6,758,565 | B1 * | 7/2004 | Cobb et al. .................... 353/34 |
| 7,202,917 | B2 | 4/2007 | Katoh et al. |
| 2002/0171809 | A1 * | 11/2002 | Kurtz et al. ................... 353/20 |
| 2003/0202159 | A1 * | 10/2003 | Cobb et al. .................... 353/31 |
| 2004/0119949 | A1 * | 6/2004 | Ito .............................. 353/31 |

FOREIGN PATENT DOCUMENTS

| JP | 06-186524 A | 7/1994 |
| JP | 09-318904 A | 12/1997 |
| JP | 2000-152267 A | 5/2000 |
| JP | 2000-241769 A | 9/2000 |
| JP | 2000-241770 A | 9/2000 |
| JP | 2001-100314 A | 4/2001 |
| JP | 2001-255605 | * 9/2001 |
| JP | 2001-359112 A | 12/2001 |
| JP | 2003-021830 A | 1/2003 |

OTHER PUBLICATIONS

Masahiro Yamaguchi; "Multiprimary Color Displays"; *Color Forum Japan '99 Collected Papers*; Optical Four Soc., Nov. 1999; pp. 73-79.

* cited by examiner

*Primary Examiner*—William C. Dowling
(74) *Attorney, Agent, or Firm*—Oliff & Berridge, PLC

(57) ABSTRACT

A projector which is small in size and excellent in light utilization efficiency while keeping the advantage of a spatially-pixel-arrangement type is provided. The luminous flux emitted from a light source is separated by a color separation system into a plurality of kinds of colors of light different in exit direction. These separated colors of light are modulated by a light valve, to form first optical images. The light valve has a plurality of sub-pixels provided corresponding to the colors of light and micro-lenses to focus the colors of light corresponding to the sub-pixels. The sub-pixels are structured in a size nearly equal to a size of a color of light to be focused on the relevant sub-pixel by micro-lenses. Accordingly, the first optical image is in a form non-analogous with the actual projection image. The first optical images are converted into second optical images having a desired aspect ratio by an anamorphic projection system, and then projected.

15 Claims, 10 Drawing Sheets

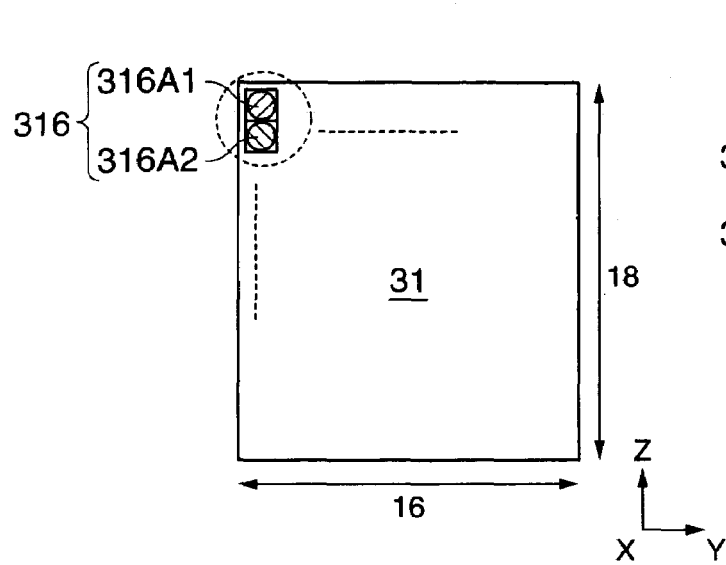
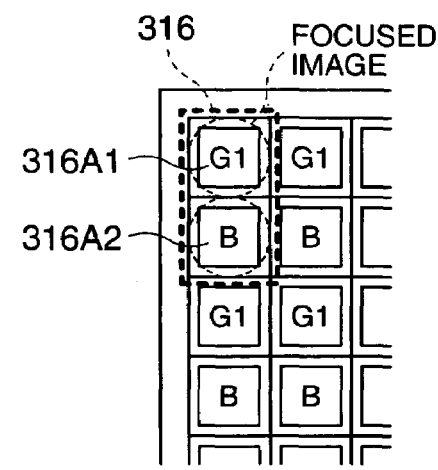
FIG. 5A            FIG. 5B
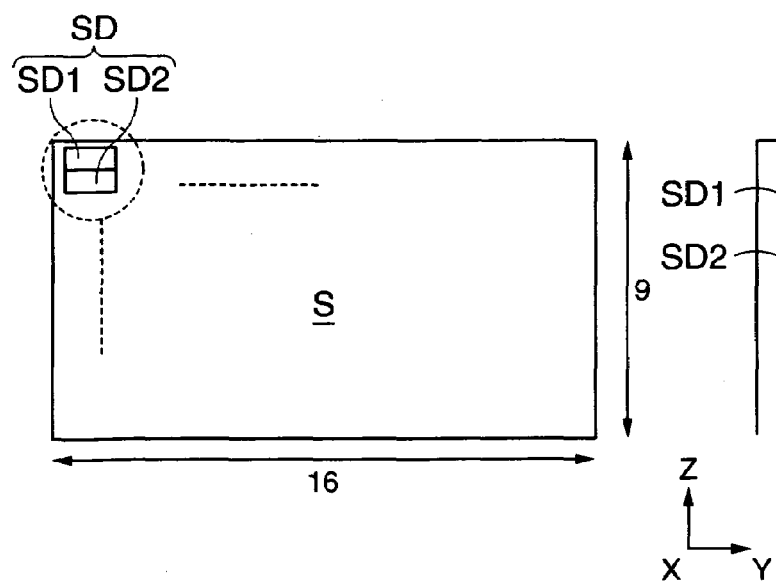
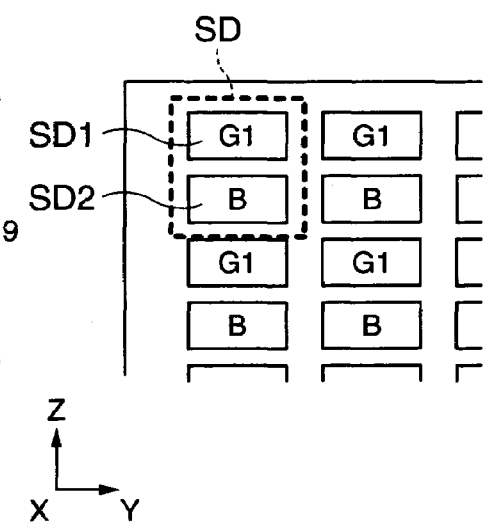
FIG. 6A            FIG. 6B

PROJECTOR

BACKGROUND

Exemplary aspects of the present invention relate to a projector of a spatial-pixel-arrangement type which is to spatially separate the light emitted from the light source into a plurality of colors of light and allows those separated colors of light to enter the corresponding sub-pixels thereby effecting a display with color.

A related art method employs three primary colors of light, i.e. red light (R), green light (G) and blue light (B), as a method to produce a color image on the projector. However, with this method, it is impossible to cover fully the color range the human eye is able to visually perceive. In order to reproduce a real color with fidelity and naturalness, there is a requisite need to broaden the color range. For example, color light, at around 510 nm could be modulated independently in addition to the red light (R), green light (G) and blue light (B) as in the related art. Thus, the range of colors expressible can be broadened significantly. This makes it possible to display bright cyan and dark green. Under such a background, considerations are made on a projector to produce a color image by use of four kinds or more of colors of light including colors of light added to three primary colors. See Yamaguchi, "Multi-primary-color Display," Color Forum Japan' 99 Collected Papers, Optical Four Soc., November 1999, p.73-79.

SUMMARY

There are several forms of projectors using multiple colors of light as disclosed e.g. in Yamaguchi, "Multi-primary-color Display," Color Forum Japan' 99 Collected Papers, Optical Four Soc., November 1999, p.73-79. The representative forms of examples are presented in cases using four colors of light, in the following.

(1) Split-plane Projector. This projector includes a color-of-light separating and color-of-light combining system structured by arranging in parallel three pairs of dichroic mirrors and four light valves between those optical systems, similar to a three-plate-type projector using a dichroic mirror arranged parallel as a color combining system. Because a projection image is formed by using the light valves independently color by color, light utilization efficiency is higher as compared to the juxtaposed-pixel type and time-divisional type projectors. This makes it easy to realizes an increase of projection image brightness. However, because four light valves are required and further four colors of light are to be combined through use of three dichroic mirrors, the distance between the light valve and the projection lens must be long. Thus, cost and size reductions are difficult to achieve in this projector.

(2) Juxtaposed-pixel Type Projector. This projector includes four-color filters arranged, on the same plane, differently from pixel to pixel in a manner corresponding to the pixel arrangement on the light valve, thereby forming a projection image with color. Because it is structurally quite simple and color projection image forming is possible by one light valve only, the reduction of size and cost is easy to achieve in this projector. However, because color light is produced at the color filter, light utilization efficiency is very low. This makes it quite difficult to increase the brightness of the projection image. There is less suitability to increase definition in the projection image because of juxtaposed sub-pixels corresponding to the colors of light.

(3) Time-division Type Projector. In this projector projection images in respective colors of light are produced time-divisionally by rotating a disk-formed color filter arranging four color filters in a fan form so that they can be displayed continuously in time thereby allowing the human eye to recognize a color image, similar to the single-plate projector having a rotary color filter. Because a color projection image can be formed by one light valve and further a multi-color projection image can be easily produced, the reduction of size and cost is easy to achieve in this projector device. However, because of shortened display time as to each color of light, light utilization efficiency is low. This makes it difficult to increase the brightness of projection image. There is also a disadvantage that the light valves applicable are limited in kind because the light valve for image formation requires high-speed responsibility.

(4) Spatial-pixel-arrangement Type Projector. This projector uses a light valve having one micro-lens per four sub-pixels (hereinafter, the light valve of this structure is referred to as a spatial-color separation light valve), to produce a plurality of colors of light from light-source light by a color separation system, such as four dichroic mirrors arranged in a fan form or a hologram device so that different colors of light can enter sub-pixels, respectively, thereby forming a color projection image. Because color light is produced without the use of a color filter, light utilization efficiency is relatively high as compared to the time-division projector or the juxtaposed-pixel projector. This makes it comparatively easy to increase the brightness in the projection image. Because a color projection image can be formed by one light valve only, size reduction is easy to achieve on the projector device. However, the colors of light separated at the color separation system exit in the form of divergent light having a wide angular distribution due to focusing at a micro-lens (maximum focusing angle $\alpha_o$) and directional separation at the color separation system (separation angle $\beta_o$). Thus, there is a problem of requiring a projection lens having a great numeric aperture capable of including a luminous flux in its diameter during divergence.

The related art schemes, each involving merits and demerits, have a difficulty in realizing, at the same time, projection-image brightness increase, projection-image definition increase, projector-device size reduction, projector-device cost reduction, etc. However, the spatial-pixel-arrangement type projector shown in (4) is higher in light utilization efficiency as compared to the juxtaposed-pixel projector or time-division projector shown in (2) and (3), and simpler in structure as compared to the split-plane projector shown in (1). Accordingly, it can be considered the most prospective scheme of among those.

However, the considerations made by the present inventor has revealed that, in the spatial-pixel-arrangement type projector, effects are actually not obtainable to a degree as expected, although device size reduction and brightness increase are realized. This is because of the following reason. Specifically, in the related art spatial-pixel-arrangement type projector, because there is established an analogous relationship between a projection image and a light-valve display area, the opening of each sub-pixel (constituent unit making up a pixel as a picture element) is not necessarily set up in an ideal form relative to the sectional form (focused image form) of a luminous flux focused by the micro-lens (opening form not to be set up freely because of the form of light-valve display area first decided). Hence, illumination efficiency available is not necessarily high if considered with reference to the dimensions of the light valve. Specifically, the related art projector has a light-valve display area set up to be analogous with a projection image from the consideration of the ease of construction of a projection system, as shown in FIG. 14A. Consequently, each of a plurality of sub-pixels arranged for one micro-lens is provided as an elongate form having a great vertical-to-horizontal ratio, as shown in FIG. 14B. For this reason, when light is focused on each sub-pixel by the micro-lens, useless spaces occur in the longer-side direction of sub-pixel where no light is to enter. Because sub-pixels are arranged at a narrow interval in the shorter-side direction of sub-pixel, the color of light also enters both adjacent sub-pixels differently from the sub-pixel corresponding to the color of light, thus readily causing a color mixture and an image quality deterioration.

Although an explanation was made using four colors of light as an example, the above problem is not limited to such a structure, i.e. the problem is common to cases using three, five or more, colors of light.

Therefore, exemplary aspects of the present invention provide a projector small in size and excellent in light utilization efficiency while keeping the merit of the foregoing spatial-pixel-arrangement type. Particularly, exemplary aspects of the present invention provide a small-sized projector excellent in light utilization efficiency, which is capable of broadening the range of colors to be displayed as compared to the related art projector, through forming a projection image by use of four kinds of color light.

In order to address and/or solve the above and/or other problems, a projector of an exemplary aspect of the present invention includes: a light source to emit light containing a visible region of light; a color separation system to separate a luminous flux emitted from the light source into a plurality of kinds of colors of light different in exit directions; a light modulation system to module the plurality of kinds of colors of light separated at the color separation system and forming first optical images; and an anamorphic projection system to convert the first optical images formed at the light modulation system into second optical images having a desired aspect ratio thereby projecting same. The light modulation system includes a light valve having a plurality of sub-pixels provided corresponding to the plurality of kinds of colors of light separated at the color separation system and micro-lenses to collect the plurality of kinds of separated colors of light and allowing same to exit to corresponding ones of the sub-pixels, the sub-pixels being formed in a form necessary and sufficient to include the color of light focused on the sub-pixel by the micro-lens.

In the projector of an exemplary aspect of the invention, in the case that the focused image to be formed by the micro-lens is nearly circular for example, a match is taken with a focused image by the sub-pixel in a necessary minimum form to include the focused image, e.g. nearly a square form generally circumscribing or inscribing the focused image. As for the resulting non-analogous relationship of a projection image with a light-valve display area, adjustment is made by aspect-conversion at the anamorphic projection system. Accordingly, it is possible to provide compatibly both light-utilization-efficiency enhancement and light-valve size reduction. Incidentally, the sub-pixel dimensional form is desirably set up to completely include a focused image based on the micro-lens. However, where emphasis is placed on the light-valve size reduction, dimensional form may be established in such a degree that no focused image is formed at the opening of another (adjacent) sub-pixel different from the sub-pixel corresponding to the focused image.

In the projector of an exemplary aspect of the invention, the structure can be such that a plurality of sub-pixels, corresponding to different colors of light one from another, are arranged in one direction. The plurality of sub-pixels have an arrangement direction established in a direction of a shorter side of the projection image having a rectangular form. With this structure, because the light valve is approximated in form to a square, a good match can be taken with the illumination luminous flux from the light source. This makes it easy to enhance the light-valve illumination efficiency.

In the projector of an exemplary aspect of the invention, the structure can be such that the light valve is made up by a liquid-crystal device, a polarization conversion system being provided between the light source and the light modulation system that is to convert non-polarized light emitted from the light source into light aligned in polarization direction. Specifically, the polarization conversion system can be provided with a polarization separating element to spatially separate two kinds of polarized luminous fluxes contained in the non-polarized light, and a polarization converting element to align the polarization direction of one polarized luminous flux separated by the polarization separating element into a polarization direction of the other polarized luminous flux.

This can enhance the light utilization efficiency greatly and realize the further increase of projection image brightness.

In the projector of an exemplary aspect of the invention, the structure can be such that a plurality of sub-pixels, corresponding to same color of light, are arranged in one direction. The plurality of sub-pixels have an arrangement direction established in a direction parallel with a polarization separated direction due to the polarization separating element.

On a polarization conversion system involved with spatial polarization separation, e.g. PBS (polarization beam splitter), there generally encounters a spread of illumination-light angular distribution in a direction of polarization separation. The focused image also is elliptic in form spread in the direction of polarization separation. Accordingly, in case a polarization separation direction is established in a direction orthogonal to the arrangement direction of a plurality of sub-pixels corresponding to the foregoing same color of light (i.e. in an arrangement direction of a plurality of sub-pixels corresponding to mutually different colors of light), color mixture occurs between the adjacent sub-pixels. In the case of setting a polarization separation direction, as in the structure of an exemplary aspect of the invention, even when the focused image is spread into an ellipse, the adjacent sub-pixels correspond to the same color of light and hence no color mixture occurs between the both. Thus, there is less possibility of an occurrence of image quality deterioration.

In the projector of an exemplary aspect of the invention, the structure can be such that the light aligned in a polarization direction exiting the polarization conversion system is given as S-polarized light.

By thus providing the light exiting the polarized conversion system as S-polarized light, reflectivity can be enhanced at the color separation plane (e.g. dichroic plane) of the color separation system. This makes it possible to enhance the light utilization efficiency and realize a further increase of projection image brightness.

In the projector of an exemplary aspect of the invention, the structure can be such that the sub-pixel or an opening form of the sub-pixel is in a rectangular form having a longer side in a direction in which an angular distribution of illumination light spreads. In the case of focusing by the micro-lens the illumination light whose angular distribution is spread in one direction, the focused image formed is elliptic in form. Accordingly, in case the sub-pixel or an opening form of the sub-pixel is in such a form, the focused image can be allowed to enter the light valve with efficiency, thus enhancing the light utilization efficiency at the light valve.

In the projector of an exemplary aspect of the invention, the light valve has a display area desirably in a form of nearly a square. Generally, where illuminating an object highly axi-symmetric, such as a square, by a luminous flux highly axi-symmetric, high illumination efficiency is easily obtained. With the light valve in such a form, match is enhanced between an illumination luminous flux from the light source and a light-valve form. This makes it easy to enhance the illumination efficiency to the light valve. In the case of making the sub-pixel or an opening form of the sub-pixel in an elongate rectangular form corresponding to the spread of illumination-light angular distribution as noted above, by properly setting up the sub-pixel or an opening form of the sub-pixel, the light-valve display area can be efficiently set up approximate to a square in form.

In the projector of an exemplary aspect of the invention, the structure can be such that the color separation system is structured to separate a luminous flux emitted from the light source into three kinds of colors of light, the light modulation system having a light valve to modulate the three kinds of color of light separated by the color separation system.

In this structure, because the light-valve display area is set up based upon the dimensional form of a focused image formed by the micro-lens instead of the form of a projection image, size reduction can be realized for the light valve while raising the light utilization efficiency as compared to the related art spatial-pixel-arrangement type projector to display a color image by modulating three colors of light.

In the projector of an exemplary aspect of the invention, the structure can be such that the color separation system is structured to separate a luminous flux emitted from the light source into four kinds of colors of light. The light modulation system having a first light valve to modulate any two kinds of colors of light of among the four kinds of color of light separated by the color separation system, and a second light valve to modulate other two kinds of colors of light. A color combining system is provided between the light modulation system and the anamorphic projection system that is to combine together the four kinds of colors of light modulated by the first light valve and second light valve.

Here, the color separation system can employ a first color separation element to separate the luminous flux emitted from the light source into two kinds of colors of light, a second color separation element to further separate any one of the colors of light separated by the first color separation element into two kinds of colors of light, and a third color separation element to further separate the other of the colors of light separated by the first color separation element into two kinds of colors of light. The first to third color separation elements and color combining system can use dichroic mirrors or dichroic prisms.

In this structure, because four kinds of colors of light are to be modulated independently by use of the light valve capable of modulating two kinds of colors of light independently, a projection image can be formed broader in color expression range as compared to the related art projector to modulate three colors of light. Although four kinds of color of light are modulated independently, two liquid-crystal devices suffice because two kinds of color of light are modulated by one light valve. Consequently, the reduction of size, weight and cost can be readily realized for the device as compared to the related art three-plate-type modulator. Because of using two liquid-crystal devices, higher definition is easier to realize as compared to those of single-plate type. The light valve of an exemplary aspect of the invention is a light valve, termed a so-called spatially-pixel-arrangement type, having a configuration in which two kinds of sub-pixels adjacent to each other to modulate two kinds of colors of light independently are provided in a matrix form and micro-lenses to collect light and allowing the same to exit to the two kinds of the sub-pixels are provided at the light-incident side in a matrix form. In the projector of this structure, because two colors of light previously separated in a traveling direction (directional separation) at the color separation element are caused to enter the light valve and modulated independently on a sub-pixel basis, there is no need to use a color filter, etc. during color generation thus realizing the higher light utilization efficiency. Accordingly, it is possible to provide compatibly both projection-image brightness increase and color-expression range extension. Furthermore, because the present structure arranges two kinds of sub-pixels corresponding to different colors of light from each other on one light valve, where the final vertical-to-horizontal ratio of projection image is in a form approximate to 1:2, e.g. of 9:16, the light-valve display area can be made nearly square in form. Specifically, because exemplary aspect of the invention have sub-pixels provided in such a dimensional form as to necessarily and fully include the focused image formed by the micro-lens as noted before, the sub-pixels are to be formed nearly square where to form a focused image nearly circular, for example. For this reason, where arranging the two kinds of sub-pixels in a direction of the shorter side of a projection image, the light-valve display area itself is provided nearly square in form. This makes it easy to take a match with the illumination luminous flux from the light source and hence to enhance the illumination efficiency.

In the projector of an exemplary aspect of the invention, the structure can be such that the color separation system is structured to separate a luminous flux emitted from the light source into four kinds of colors of light, the light modulation system having a first light valve to modulate any three kinds of colors of light of among the four kinds of color of light separated by the color separation system, and a second light valve to modulate other one kind of color of light, a color combining system being provided between the light modulation system and the anamorphic projection system that is to combine together the four kinds of colors of light modulated by the first light valve and second light valve. This structure also is to modulate four kinds of colors of light independently through the use of two light valves, making it possible to realize a projector that is broad in color expression range, small in size, light in weight and low in cost. In this case, the color of light to be modulated at the second light valve is desirably a color of light smallest in light intensity of among the colors of light emitted from the light source. In a case of making a structure to assign a color of light smaller in light intensity to a monochromatic valve, intensity balance is ready to take with the other colors of light. This is effective in broadening the display color range.

In the projector of an exemplary aspect of the invention, the structure can be such that the color combining system has a dichroic plane, a polarization rotating element to rotate a polarization direction of light by 90 degrees being provided on an incident side or an exit side of any one of the first and second light valves such that colors of light reflected upon and combined at the dichroic plane assume S-polarized light while colors of light transmitted through and combined together at the dichroic plane assume P-polarized light.

Generally, at the dichroic plane, reflectivity is higher as to S-polarized light rather than P-polarized light while a transmission ratio is higher as to P-polarization light than S-polarization light. Taking account of such a light combining efficiency (transmission ratio and reflectivity) at the color combining plane (dichroic plane) of the color combining system, higher light-utilization efficiency can be realized by providing S polarization light as colors of light to be combined by reflection and P polarization light as colors of light to be combined by transmission. The polarization rotating element may be in an arrangement position on the light-incident or light-exit side of the two light valve. Because arrangement position relates to an arrangement form of the color combining plane of the color combining system, the polarization rotating element, briefly, may be arranged such that the color of light to be combined by reflection at the color combining plane of the color combining system is S-polarized light. Nevertheless, where the projector is not provided with a polarization conversion system wherein the polarization rotating element is arranged on the light-incident side of the light valve, there is a need to arrange the polarization rotating element on the light-exit side of a polarizer plate positioned on the light-incident side.

In the projector of an exemplary aspect of the invention, the structure is desirably such that the plurality of colors of light to be separated by the color separation system are blue light, shorter-wavelength green light, longer-wavelength green light and red light. Here, it is possible to set up a boundary wavelength of the shorter-wavelength green light and longer-wavelength green light at nearly 515 nm to 540 nm.

When taking account of the fact that the color range to be expressed on the existing device using three primary colors is at around from 490 nm to 570 nm and hence considerably narrow relative to the color range visually perceivable by the human eye and further that human visual perceptibility is higher to green light, it is possible to realize a broad color expression range (color range) nearer to the color range perceivable by humans and a high resolution feeling upon viewing, by dividing green light into two wavelength bands and modulating those independently. Furthermore, metal halide lamps include those having strong two bright-line spectrums at around from 490 nm to 570 nm. Where using such a lamp as a light source, a boundary wavelength of the shorter-wavelength green light and longer-wavelength green light may be established at between the two bright-line spectrums. Because this makes it possible to modulate a bluish green and a yellowish green independently, the color range to be displayed can be broadened further effectively.

BRIEF DESCRIPTION OF THE DRAWINGS

FIGS. 5A and 5B are schematics showing the form of a sub-pixel of the light valve;

FIGS. 6A and 6B are schematics showing the form of an optical image projected on the screen;

DETAILED DESCRIPTION OF EXEMPLARY EMBODIMENTS

Exemplary embodiments of the present invention will be explained in the following. In all the ensuing figures, the constituent elements are shown different as to film thickness, dimensional ratio and so on, in order to make the figures easy to view.

First Exemplary Embodiment

A first exemplary embodiment of the invention is explained by using FIGS. 1 to 9.

Figure 1:
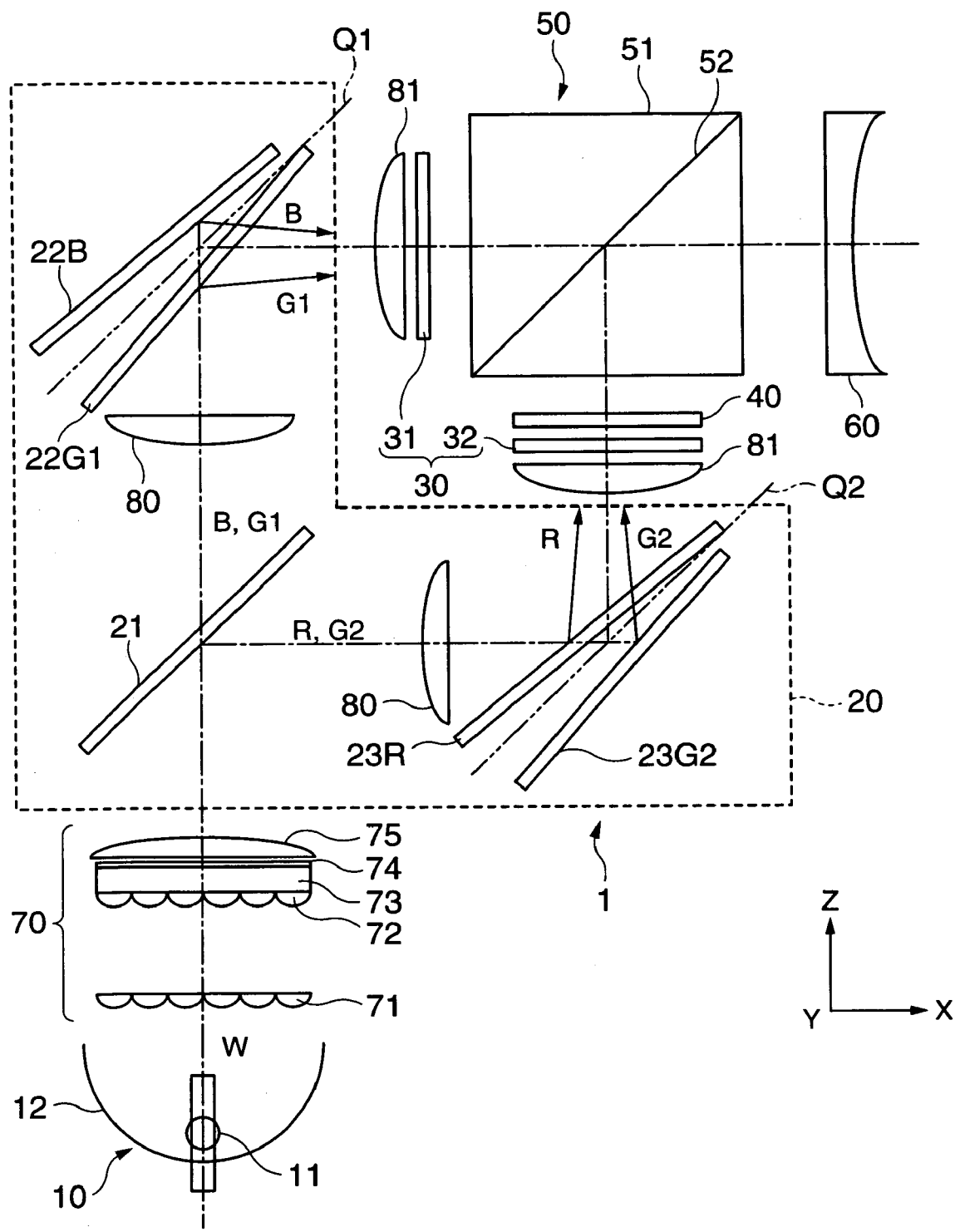
FIG. 1 is a schematic of a projector according to exemplary embodiment 1 of the present invention.

FIG. 1 is a schematic of a projector according to the present exemplary embodiment. The projector 1 is constructed with a light source 10 to emit light including the visible region of light, a polarization conversion system 70 to convert the non-polarized light emitted from the light source 10 into light aligned in polarization direction, a color separation system 20 to separate the light from the light source 10 into four kinds of colors of light different in wavelength band, a light modulation system 30 to modulate light depending upon external image information and forming optical images (first optical images) color by color, a light combining system 50 to combine the first optical images together and form one color optical image, and a projection system 60 to project the color optical image thus formed onto a projection plane (not shown).

The light source 10 has a light-source lamp 11 to emit rays of light radially, and a reflector 12 to throw the rays radiated from the light source 11 toward one direction. The light-source lamp 11 can employ a high-pressure mercury lamp, a metal-halide lamp, a halogen lamp, a xenon lamp or the like while the reflector 12 can use a parabolic reflector, an elliptic reflector, a spherical reflector or the like.

The polarization conversion system 70 has a first lens array (luminous-flux dividing element) 71 and second lens array (focusing element) 72 as an integrator system to make uniform the illuminance distribution of a luminous flux emitted from the light source 10, a polarization-beam splitter array (polarization separating element) 73 to spatially separate the two kinds of polarized luminous fluxes contained in non-polarized light, a retardation wave plate array (polarization converting element) 74 to convert one of the polarized luminous fluxes separated (e.g. P-polarized luminous flux) into the other of the polarized luminous fluxes (e.g. S-polarized luminous flux), a superimposing lens (superimposing element) 75, and so on. The polarization conversion system 70 used here is based on related art disclosed in JP-A-8-304739 for example, and hence omitted to explain in detail.

Figure 2A:
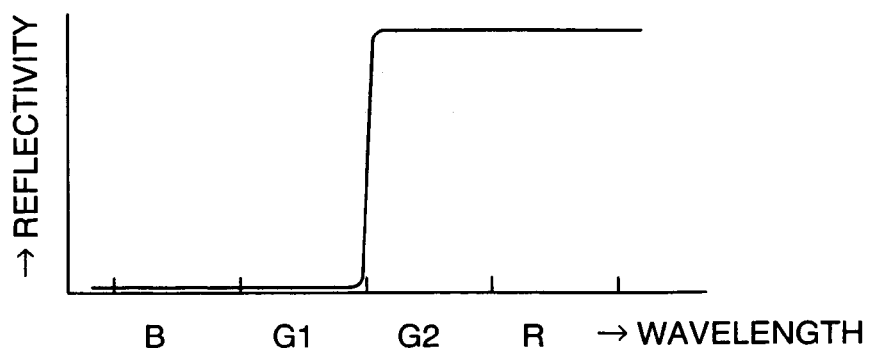
FIGS. 2A-2C are schematics of a spectral characteristic of a dichroic mirror.
Figure 2B:
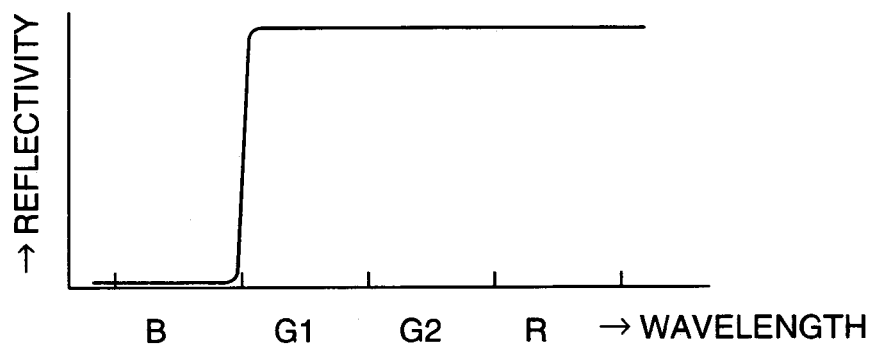
Figure 2C:
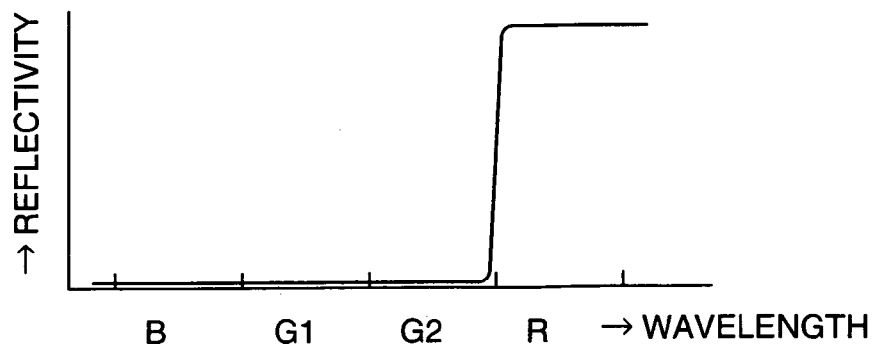
Figure 3:
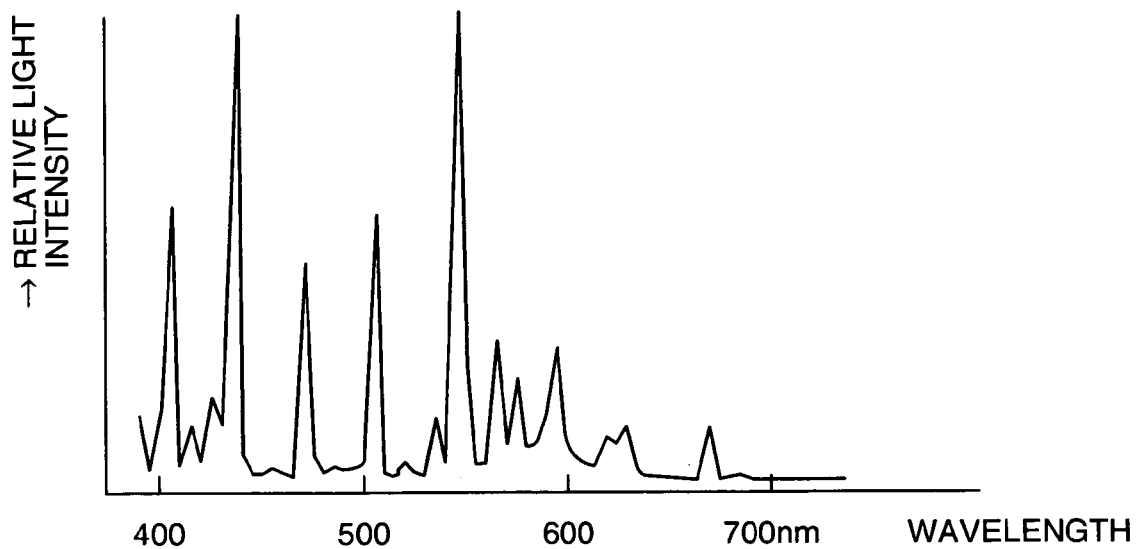
FIG. 3 is a schematic of light-emission spectral distribution of a light-source lamp.

The color separation system 20 has a dichroic mirror 21 as a first color separation element, a dichroic mirror 22G1 as a second color separation element, a reflection mirror 22B, a dichroic mirror 23R as a third color separation element, and a reflection mirror 23G2. The dichroic mirrors 21, 22G1, 23R, in three kinds, are mirrors having a wavelength-selective characteristic allowing a particular wavelength region of color light to pass or reflect upon. These are realized by forming a dielectric multi-layer film over a transparent substrate, such as glass. There is shown, in FIGS. 2A to 2C, one example of spectral characteristics of the dichroic mirrors 21, 22G1, 23R. Here, FIG. 2A shows the dichroic mirror 21, FIG. 2B the dichroic mirror 22G1 and FIG. 2C the dichroic mirror 23R, respectively. Here, the blue light B in the figure is assumed to be light in a wavelength region of nearly 380 nm to 495 nm, the green light G1 is light in a wavelength region of nearly 495 nm to 525 nm, the green light G2 is light in a wavelength region of nearly 525 nm to 585 nm, and the red light R is light in a wavelength region of nearly 585 nm to 780 nm. However, this is not limitative. Nevertheless, if taking account of the fact that the color range to be expressed on the existing device using three primary colors is around 490 nm to 570 nm and hence considerably narrow relative to the color range visually perceivable by the human eye and wherein the human visual perceptibility is higher for green light and hence green light has a great effect upon the resolution feeling during viewing, it is desired to divide green light into two wavelength regions and modulate those independently. There is shown in FIG. 3 an emission spectrum distribution of a metal halide lamp as an example of the light-source lamp 11. In the case of this light-source lamp 11, bright-line spectrums exist at around 505 nm and 545 nm within the wavelength region corresponding to green light. By taking the color of light including the bright-line spectrum of 505 nm as a shorter wavelength of green light G1 (bluish green light) while the color of light including the bright-line spectrum of 545 nm as a longer wavelength of green light G2 (yellowish green light) and thereby modulating the two kinds of green light G1, G2 independently, it is possible to realize a broadened color expression range and enhanced resolution during viewing.

The dichroic mirror 21 is a mirror that allows blue light B and shorter-wavelength green light G1 to transmit, but reflects red light R and longer-wavelength green light G2 thereupon. The dichroic mirror 22G1 is a mirror that causes shorter-wavelength green light G1 to reflect but allows blue light B to pass. The dichroic mirror 23R is a mirror that causes red light R to reflect thereupon but allows longer-wavelength green light G2 to transmit. However, this is not limitative. The spectral characteristic of each dichroic mirror relies also upon the arrangement state thereof and the color-light-incident-direction set status on the light modulation system 30. For example, the dichroic mirror 22G1 may be a mirror that reflects blue light B but transmits shorter-wavelength green light G1. However, note that, in order to provide the light modulation system 30 with a color-light incident direction the same as that of FIG. 1, there is a need to arrange the dichroic mirror 22G1 and the reflection mirror 22B with spacing between both openings in a direction reverse to FIG. 1 (both are narrower in spacing in the directions of +X and +Z, in FIG. 1). The reflection mirror 22B and the reflection mirror 23G2 are respectively arranged for the purpose of reflecting the colors of light transmitted by the dichroic mirror 22G1 and the dichroic mirror 23R, and hence those may be ordinary mirrors. However, those are desirably dichroic mirrors because reflectivity can be readily raised and illumination light can be easily increased in color purity by selective reflection of a particular wavelength of color light.

In this exemplary embodiment, the dichroic mirror 22G1 and the reflection mirror 22B are arranged in closer order to the light source 10 on the optical path where passing the dichroic mirror 21, while the dichroic mirror 23R and the reflection mirror 23G2 are arranged in closer order to the light source 10 on the optical path where reflected by the dichroic mirror 21. However, this is not limitative. For example, the dichroic mirror 22G1 and the reflection mirror 22B may be reversed in arrangement relationship to the present exemplary embodiment, i.e. may be in a form that the color light from the dichroic mirror 21 first enters the reflection mirror 22B (in this case, naturally the reflection mirror 22B must be a dichroic mirror in the corresponding manner). The positional relationship must be decided by taking into consideration the intensity ratio of the colors of light from the light source 10. For example, in case the dichroic mirror is arranged to first reflect the color of light comparatively lower in light intensity, the colors of light can be balanced in terms of intensity ratio. This is effective in broadening the range of colors for display. For similar reasons, the dichroic mirror 23R and the reflection mirror 23G2 may be reverse in positional relationship to the present exemplary embodiment.

Here, the color of light to be reflected upon and separated by the dichroic mirror 23R and dichroic mirror 21 is taken as a minimal intensity of color light from among the colors of light emitted from the light source, or a plurality of colors of light including that color of light. This is because reflectivity generally is readily enhanced at the dichroic mirror as compared to transmissivity, the form focusing the reflection of the minimal intensity of color light can effectively reduce the loss of the relevant color light thus providing a color balance without lowering the intensity of other colors of light. This can provide compatibly in both light-use-efficiency enhancement and display-color-range broadening, thus realizing a light projection image excellent in color balance. Specifically, the two dichroic mirrors 21, 23R are set up to reflect red light R, for the purpose of reducing the loss of red light. This is because the light-source lamp 11 in this exemplary embodiment assumably employs a metal halide lamp or a high-pressure mercury lamp. From the similar point of view, the dichroic mirror 23R is arranged forward of the reflection mirror 23G2 (in a position closer to the light source 10).

The dichroic mirror 22G1 and the reflection mirror 22B are arranged so that the luminous fluxes emitted from the light source 10 can enter a first two-color-modulating spatial color separation light valve 31, referred to later, at incident angles different from each other. Specifically, a virtual axis Q1 is set up assuming 45 degrees relative to the axis of incident luminous flux on an XZ plane. The two mirrors 22G1, 22B are arranged in a non-parallel state with each other about the axis Q1 as an axis of symmetry (both are narrower in spacing in the directions of +X and +Z, in FIG. 1). Accordingly, the green light G1 reflected upon the dichroic mirror 22G1 and the blue light B reflected upon the reflection mirror 22B are to exit separately in different two directions on the XZ plane. Likewise, for the dichroic mirror 23R and the reflection mirror 23G2, a virtual axis Q2 is set up assuming 45 degrees relative to the axis of incident luminous flux on an XZ plane. They are arranged in a non-parallel state with each other about the axis Q2 as an axis of symmetry. Accordingly, the red light R reflected upon the dichroic mirror 23R and the green light G2 reflected upon the reflection mirror 23G2 are to exit separately in two directions different on the XZ plane. The arrangement state of the dichroic mirror 22G1 and reflection mirror 22B and the dichroic mirror 23R and reflection mirror 23G2 is not limited to the above. Although in FIG. 1 both are in an arrangement state that is narrower in spacing in the directions of +X and +Z, the arrangement state may conversely broaden the spacing of the both in the directions of +X and +Z.

Collimator lenses 80 are arranged on the respective incident sides of the dichroic mirror 22G1 and reflection mirror 22B and of the dichroic mirror 23R and reflection mirror 23G2. In case the collimator lenses 80 are arranged in those positions, the respective polarized luminous fluxes exiting the superimposing lens 75 are collected relative to the axis thereof, thus entering the dichroic mirrors 22G1, 23R nearly in a collimated state. Because the dichroic mirror has a dependence-on-incident-angle in its spectral characteristic, the use of collimator lenses 80 is desired as in this exemplary embodiment. In such a case, the luminous flux entering the dichroic mirror 22G1, 23R can be narrowed in its angular distribution, to allow accurate color separation at second and third color separation elements. Accordingly, this can realize color-irregularity suppression, image-quality enhancement and brightness increase in the projection image. In order to reduce the dependence-on-incident-angle of the spectral characteristic for the dichroic mirror, the dichroic mirror may be made in a gradient type such that the spectral characteristic is different from point to point on the plane. Such a dichroic mirror, if used, eliminates the necessity of the collimator lens 80. It may be naturally used together with the collimator lens 80. The collimator lenses 80 may be omitted for an illumination system having a great F value. Specifically, an illumination system having a small illumination angle.

The light modulation system 30 has two spatially-color-separating light valves of the two-color-modulating type to modulate the colors of light separated by the color separation system 20, i.e. a first two-color-modulating spatially-color-separating LV (first light valve) 31 and a second two-color-modulating spatial-color-separation LV (second light valve) 32. The first and second two-color-modulating spatial-color-separation LV 31, 32 have basically the same structure. Both are distinguished by the difference of modulation color of light. In this exemplary embodiment, the first two-color-modulating spatial-color-separation LV 31 modulates blue light B and shorter-wavelength green light G1 while the second two-color-modulating spatial-color-separation LV 32 modulates red light R and longer-wavelength green light G2.

Figure 4:
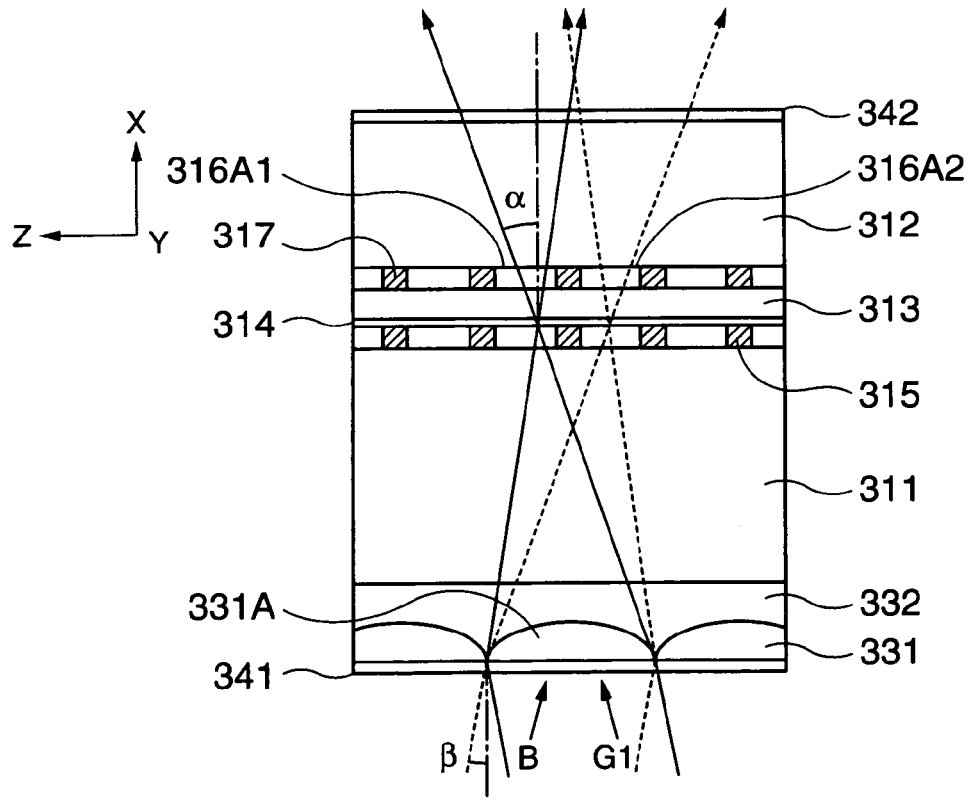
FIG. 4 is a schematic of a light valve.

The two-color-modulating spatial-color-separation LV 31, 32 is a transmission liquid-crystal device which optically modulates the two kinds of incident colors of light independently depending upon external image information, not shown, and forming optical images (first optical images), to thereby output a modulated luminous flux at the opposite side to the incidence. FIGS. 4 and 5A and 5B show respectively a sectional structure and a plan structure of the two-color-modulating spatial-color-separation LV of this exemplary embodiment. FIG. 4 exemplifies the first two-color-modulating spatial-color-separation LV 31. The two-color-modulating spatial-color-separation LV 31, 32 has a general structure nearly the same as the generally-used monochromatic liquid-crystal device excepting in that having a plurality of sub-pixels 316A1, 316A2 (attached with the same reference as the sub-pixel electrode in the figure, because the sub-pixel means a pixel to be driven by a sub-pixel electrode, referred to later) within one picture element (meaning a gathering of sub-pixels arranged corresponding to the same unit micro-lenses, referred later) and in that having the corresponding micro-lens array. Specifically, the two-color-modulating spatial-color-separation LV 31 is made up of a twisted nematic (TN) liquid crystal 313, or electro-optic material, filled between two transparent substrates (counter substrate 311, TFT substrate 312) made of glass or the like. On the counter substrate 311, there are formed a common electrode 314, a black matrix 315 to block unwanted light, and so on. On the TFT substrate 312, there are formed two kinds of sub-pixel electrodes 316A1, 316A2 and thin film transistors (TFT) 317, or switching elements, and so on. The sub-pixels 316A1, 316A2 each correspond to any of four kinds of color light separated by the color separation system 20. One picture element 316 is formed by one set of sub-pixels 316A1, 316A2 arranged within the panel. In this exemplary embodiment, the sub-pixels 316A1, 316A2 on the first two-color-modulating spatial-color-separation LV 31 correspond respectively to shorter-wavelength green light G1 and blue light B whereas the sub-pixels 316A1, 316A2 on the second two-color-modulating spatial-color-separation LV 32 correspond respectively to red light R and longer-wavelength green light G2.

There is arranged a micro-lens array 331 having a plurality of unit micro-lenses 331A in a matrix form on the counter substrate 311 at its incident side. The unit micro-lenses 331A are formed on a glass plate by etching or the like, and bonded on the counter substrate 311 through a resin layer (adhesive) 332 different in refractivity from the glass plate forming the micro-lens array thereon. The micro-lens array 331 collects the two kinds of color light, that have been separated in exit direction by the dichroic mirror 22G1, reflection mirror 22B, dichroic mirror 23R, reflection mirror 23G2, etc., and causes them in a state spatially separated to enter the opposed sub-pixels 316A1, 316A2, respectively. Specifically, the micro-lens array 331 is structured such that one unit micro-lens corresponds to one set of sub-pixels 316A1, 316A2 lined in the Z direction. Accordingly, one set of sub-pixels 316A1, 316A2 are in an arrangement direction set up in a direction that the colors of light are separated in their exit direction by the dichroic mirror 22G1, reflection mirror 22B, dichroic mirror 23R, reflection mirror 23G2, etc. (in a direction on the XZ plane). Here, the unit micro-lens 331A has a Z-directional width set up nearly equal to the sum of a Z-directional width of the sub-pixel 316A1 and a Z-directional width of the sub-pixel 316A2, and has a Y-directional length set up nearly equal to a Y-directional length of the sub-pixel 316A1, 316A2 (the two sub-pixels are equal in Y-directional length to each other).

Although the Z-directional width of the sub-pixel 316A1 is set up nearly equal to the Z-directional width of the sub-pixel 316A2, this is not limitative. Both may be provided in different widths in a manner matched to the focusing characteristic for the colors of light to be incident upon the sub-pixels (e.g. to the focused spot size). Polarizer plates 342, 341 are arranged respectively on the light-exit side of the TFT substrate 312 and on the light-incident side of the micro-lens array 331.

Because the illumination light emitted from the light source 10 has an angular distribution symmetric about the axis, the micro-lenses 331A of the two-color-modulating spatial-color-separation LV 31, 32 form a focused-image (focused-spot-image sectional form) group generally circular. Accordingly, in order to pass the luminous flux having such a sectional form through the sub-pixels 316A1, 316A2 with efficiency, this exemplary embodiment has the sub-pixels 316A1, 316A2 set up nearly square in their opening forms, as shown in FIG. 5(a). In this exemplary embodiment, the sub-pixels 316A1, 316A2 corresponding to different colors of light one from another are set up vertical relative to a Y-directionally, horizontally long projection image (i.e. in a direction of the shorter side (Z direction) of a projection image having a rectangular form), in order to structure the two-color-modulating spatial-color-separation LV 31, 32 compact. In this structure, provided that the sub-pixel itself is nearly square in form resulting from the nearly square opening form, the two-color-modulating spatial-color-separation LV 31, 32 having a vertical-to-horizontal ratio in pixel (picture element) count of 9:16 is given a vertical-to-horizontal dimensional ratio in display-area of 18:16 approximate to a square. Because the illumination luminous flux from the light source 10 is nearly circular in sectional form, high illumination efficiency is to be realized where illuminating the two-color-modulating spatial-color-separation LV 31, 32 having a display area approximate to a square.

Because this exemplary embodiment is arranged with the polarization conversion system 70 between the light modulation system 30 and the light source 10, the angular distribution of illumination light somewhat spreads in the direction of polarization separation. Specifically, the focused image group formed by the micro-lenses 331A also is in an elliptic form somewhat long in that direction. For this reason, it is desired to provide the sub-pixel 316A1, 316A2 with an opening in a form somewhat long horizontally (the width is broader in the Y direction in FIG. 4) thereby raising the light-incident efficiency upon the opening. In the case of the two-color-modulating spatial-color-separation LV 31, 32 having the above pixel (picture element) count ratio, the display area is given nearly square in dimensions, e.g. the vertical-to-horizontal ratio of 18:18 or 18:20. This is well matched with the sectional form of an illumination luminous flux from the light source 10, hence making it easy to realize the high efficiency of illumination.

In a case having a structure that the sub-pixels corresponding to the same color of light are arranged in a direction where the focused image group spreads (in the Y direction in FIG. 4) while sub-pixels 316A1, 316A2 corresponding to different colors of light are arranged in a direction orthogonal to the direction the focused image group spreads (in the Z direction in FIG. 4), it is possible to reduce the fear that a non-corresponding color of light (e.g. blue light B) enters the sub-pixel (e.g. sub-pixel 316A1 for green) thus causing a color mixture resulting in image quality deterioration. Accordingly, where arranging an optical system having a characteristic to spread the illumination-light angular distribution in one direction, e.g. the polarization conversion system, on the illumination optical path, it is desired to establish a positional relationship between the optical system and the two-color-modulating spatial-color-separation LV 31, 32 such that the spread of angular distribution is coincident in direction with the arrangement of the sub-pixels corresponding to the same color of light.

In this exemplary embodiment, collimator lenses 81 are arranged on the respective exit-sides of the dichroic mirror 22G1 and reflection mirror 22B and the dichroic mirror 23R and reflection mirror 23G2 (i.e. on the respective incident-sides of the two-color-modulating spatial-color-separation LVs 31, 32). The respective polarized luminous fluxes exiting the superimposing lens 75 are collected relative to the axis thereof, to enter the first and second two-color-modulating spatial-color-separation LV 31, 32 nearly in a collimated state.

The liquid-crystal panel generally has a dependence-on-incident-angle in its display characteristic. However, by arranging the collimator lenses 81, the luminous flux entering the panel can be narrowed in its angular distribution, making it possible to realize the image-quality enhancement and brightness increase in the projection image. Furthermore, because of enhanced focusability at the unit microlens 331A to thereby form smaller focus spot, it is possible to reduce or prevent a color mixture resulting from entering, to other adjacent sub-pixels, of an unwanted color of light (color light not corresponding to the sub-pixel), thus allowing for projection-displaying a color image excellent in color representation and free of blotting. The collimator lenses 81 may be omitted for an illumination system having a great F value, specifically, an illumination system smaller in illumination angle.

In this exemplary embodiment, because the luminous flux entering the first to third color separation elements is given as S-polarized light by the polarization conversion system 70, high reflectivity is readily realized at the dichroic mirror 21, 22G1, 23R. Particularly, the dichroic mirror 21, 23R takes a form to reflect S-polarized red light, wherein red light is to be utilized without uselessness even where the light source uses a light-source lamp comparatively low in red light R intensity (e.g. part of metal halide lamps or high-pressure mercury lamp). This makes it easy to take a balance with other colors of light, thereby extending the color expression range without the lowering in light-utilization efficiency.

Figure 8:
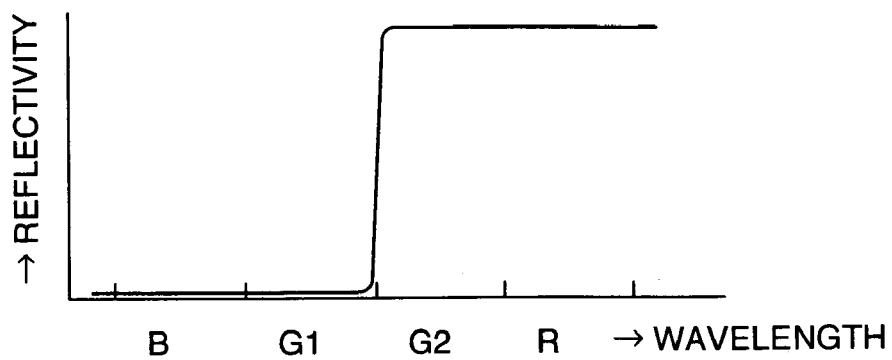
FIG. 8 is a schematic showing a spectral characteristic of a dichroic prism.
Figure 9:
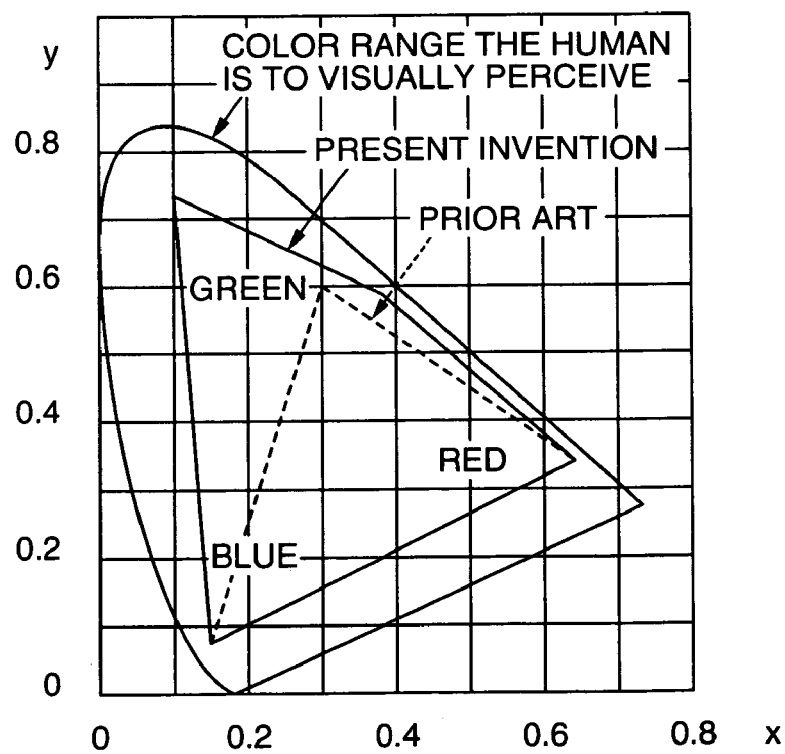
FIG. 9 is a chromaticity chart showing a projector color expression range.

The color combining system 50, having a dichroic prism 51, combines together four kinds of post-modulation colors of light exiting the first and second two-color-modulating spatial-color-separation LVs 31, 32 and forms a color image, as shown in FIG. 1. Here, there is shown in FIG. 8, a spectral characteristic of the dichroic prism 51. The dichroic prism 51 assumes a cubic form having a dichroic surface clamped by two triangular-prism-formed transparent mediums. This has a dielectric multi-layer film 52 (dichroic plane) formed diagonally of a square in plan view, allowing blue light B and shorter-wavelength green light G1 to transmit but reflecting longer-wavelength green light G2 and red light R thereupon.

In this exemplary embodiment, a polarization-rotating element 40 to rotate the polarization direction is arranged between the color combining system 50 and the second two-color-modulating spatial-color-separation LV 32 (i.e. on the light-exit side of the second two-color-modulating spatial-color-separation LV 32). The post-modulation P-polarized luminous flux from the second two-color-modulating spatial-color-separation LV 32 is converted into an S-polarized luminous flux, to enter the color combining system 50.

The color combining system 50 combines together the post-modulation four-kinds of color light exiting the first and second two-color-modulating spatial-color-separation LVs 31, 32, thereby forming a color image. Combining is made on the color light from the first two-color-modulating spatial-color-separation LV 31 as transmission light and on the color light from the second two-color-modulating spatial-color-separation LV 32 as reflection light. In this case, the color light from the first two-color-modulating spatial-color-separation LV 31 is in a state of a P-polarized luminous flux while the color light of from the second two-color-modulating spatial-color-separation LV 32 is in a state of an S-polarized luminous flux. Taking into consideration the reflectivity of S-polarized light is readily raised at the dichroic prism 51 besides at the dichroic mirror, the image-quality enhancement and brightness increase in the projection image can be realized because of the capability of efficiently combining colors of light together at the color combining system 50. The polarization-rotating element 40 is not limited in arrangement form to the present exemplary embodiment. Specifically, the polarization-rotating element 40 may be arranged on the light-incident side of the second two-color-modulating spatial-color-separation LV 32 so that the S-polarized luminous flux from the color separation system 20 can be converted into P-polarized luminous flux and then incident upon the second two-color-modulating spatial-color-separation LV 32. Furthermore, with a certain arrangement of the color combining system 50, the polarization-rotating element 40 may be arranged on the light-incident or light-exit side of the first two-color-modulating spatial-color-separation LV 31. In brief, it is satisfactory to properly arrange the polarization-rotating element 40 such that the luminous flux to be handled as reflection light at the color combining system 50 is at least an S-polarized luminous flux. Naturally, the structure may be to exit the same polarization state of light from the two two-color-modulating spatial-color-separation LVs 31, 32 without the arrangement of a polarization-rotating element 40. This allows the color combining system 50 to combine together four kinds of color light and form a desired color image.

The projection system 60 is structured as an anamorphic projection system. The anamorphic projection system refers to an optical system having a difference of magnification on between the sections vertical to each other, which is used in the imaging and projection system of cinemascope (movie). The optical system per se is related art and hence omitted of its detailed explanation. The projection system 60 may be in a form using, together with the usual lens, an anamorphic lens commercially produced as an external lens for aspect conversion. In this exemplary embodiment, the anamorphic projection system 60 projects onto a screen, with magnification, a color optical image combined by the color combining system 50 while converting it into a second optical image having a desired aspect ratio (e.g. vertical-to-horizontal ratio of 9:16).

Figure 7:
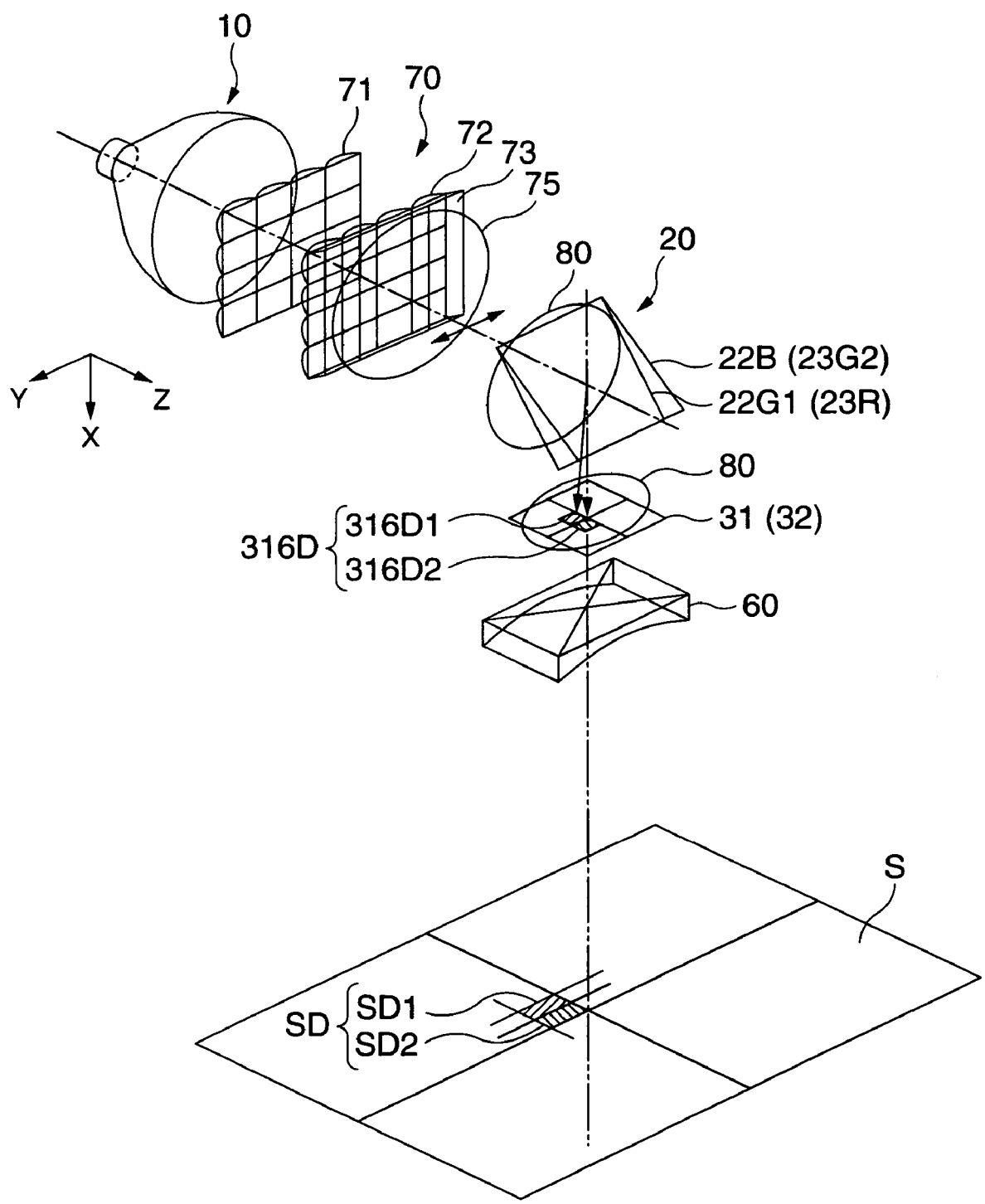
FIG. 7 is a schematic for explaining the function of the projector.

The operation of the projector 1 of this exemplary embodiment is explained by using FIG. 7. In order to easily understand the optical arrangement, there is shown in FIG. 7 an optical path of the blue light B and shorter-wavelength green light G1 to be modulated by the first two-color-modulating spatial-color-separation LV 31. The dichroic mirror 21 (first color separation element), color combining system 50 and polarization-rotating element 40 are omitted.

In the present exemplary embodiment shown in FIG. 7, the non-polarized luminous flux emitted from the light source 10 is separated into a plurality of P-polarized luminous flux group and a plurality of S-polarized luminous flux group that are orthogonal in polarization direction by the first and second lens arrays 71, 72 and polarization-beam-splitter array 73. The polarized luminous fluxes are aligned in their polarization directions, for example, as S-polarized light and exited by the retardation wave plate array 74 (see FIG. 1). Those polarized luminous fluxes are directed in their exit direction by the superimposing lens 75 to the first and second two-color-modulating spatial-color-separation LVs 31, 32, thus entering the color separation system 20 (the polarized luminous fluxes are finally superimposed together at the first and second two-color-modulating spatial-color-separation LV 31, 32).

The luminous flux entering the color separation system 20 is separated by the dichroic mirror 21 (see FIG. 1) into a blue light B and shorter-wavelength green light G1, and a red light R and longer-wavelength green light G2. The blue light B and shorter-wavelength green light G1 transmitted the dichroic mirror 21 is separated by the dichroic mirror 22G1 into blue light B and green light G1. Thereafter, the green light G1 enters directly the first two-color-modulating spatial-color-separation LV 31 while the blue light B passes the reflection mirror 22B and then enters the first two-color-modulating spatial-color-separation LV 31.

The green light G1 and the blue light B, separated in an exit direction by the dichroic mirror 22G1 and reflection mirror 22B, enter at different angles the unit micro-lens 331A on the first two-color-modulating spatial-color-separation LV 31. The green light G1 and the blue light B, entering the unit micro-lens 331A, exit at mutually different angles the unit micro-lens 331A and focused, color by color, at around the sub-pixels 316A1, 316A2 in one set lined in the Z direction. The green light G1 and the blue light B are modulated by the respective sub-pixels 316A1, 316A2, to exit at angles nearly symmetric about the direction orthogonal to the luminous-flux-incident end face of the first two-color-modulating spatial-color-separation LV 31. In this occasion, because this exemplary embodiment provides the sub-pixel 316A1, 316A2 with a nearly square form that can necessarily and fully include the focused image formed by the micro-lens 331A, it is possible to reduce the likelihood or prevent a color mixture from occurring between the adjacent sub-pixels 316A1, 316A2 while realizing high illumination efficiency. By making the sub-pixel 316A1, 316A2 nearly square in form, the two-color-modulating spatial-color-separation LV 31, 32 is provided with a display area in a form approximate to a square, e.g. the dimensional vertical-to-horizontal ratio of 18:16. This is well matched with the sectional form of an illumination luminous flux from the light source 10, and hence is easy to realize high illumination efficiency (see FIGS. 5A and 5B).

The first optical images formed by the two-color-modulating spatial-color-separation LV 31 (whose optical image has a vertical-to-horizontal ratio of 18:16, for example) are respectively magnified, while converted, into second optical images having a desired aspect ratio (vertical-to-horizontal ratio of 9:16, for example) by the anamorphic projection system 60, thus being projected onto a screen S. FIG. 6 shows the shape of an optical image projected onto the screen S. In this process, the first optical images 316D1, 316D2, made nearly square based on the sub-pixels 316A1, 316A2 shown in FIG. 5B, are converted into second optical images SD1, SD2 rectangular in form having a vertical-to-horizontal ratio of 1:2 shown in FIG. 6. Due to this, the first optical image 316D, made rectangular based on the picture element 316, is converted into a nearly square second optical image SD. Accordingly, the present exemplary embodiment, despite having the rectangular picture element 316, finally makes an aspect-conversion of the first optical image 316D by the anamorphic projection system 60, thereby making it possible to display a projection image free of unsuitableness made up by the nearly square second optical images SD (see FIGS. 6A and 6D).

The colors of light, reflected by the dichroic mirror 21, are to be optically modulated by the similar processing. Specifically, the red light R and longer-wavelength green light G2 reflected by the dichroic mirror 21 is separated by the dichroic mirror 23R into red light R and green light G2. Thereafter, the red light R enters directly the second two-color-modulating spatial-color-separation LV 32 while the green light G2 passes the reflection mirror 23G2 and then enters the same second two-color-modulating spatial-color-separation LV 32. The red light R and the green light G2, separated in exit direction by the dichroic mirror 23R and reflection mirror 23G2, are modulated respectively by the sub-pixels 316A1, 316A2 of the second two-color-modulating spatial-color-separation LV 32 and then exit the same at angles nearly mutually symmetric about the direction orthogonal to a luminous-flux incident end face thereof. The light exited the two-color-modulating spatial-color-separation LV 32 is aligned in polarization direction as P-polarized light, which light is converted into S-polarized light by the polarization-rotating element 40 (see FIG. 1) arranged on the light-exit side of the two-color-modulating spatial-color-separation LV 32. The optical image, formed by the two-color-modulating spatial-color-separation LV 32 (the optical image having a vertical-to-horizontal ratio of 18:16, for example), is magnified, while converted, into a vertical-to-horizontal ratio of 9:16, thus being projected onto the screen S.

As explained so far, the present exemplary embodiment provides the following effects.

First, because the light modulation system 30 is structured including the first and second two-color-modulating spatial-color-separation LVs 31, 32, a projection image having a broad color expression range can be formed using four kinds of color light. There is shown, in FIG. 9, a color expression range of the projector 1. It can be seen that the projector 1 of this exemplary embodiment can realize a broader color expression range as compared to the related art projector using three primary colors, because it is particularly to modulate two kinds of green light G1, G2 independently.

When compared to the projector with four kinds of color light, because colors of light can be produced without the use of a color filter, a higher definition, brighter projection image can be formed than that by the time-division type projector or juxtaposed-pixel type projector. Because the distance can be shorted between the two-color-modulating spatial-color-separation LV 31, 32 and the projection lens 60, device size reduction and projection image brightness increase can be achieved easier than the surface-division type projector. Furthermore, because there is no need to use an expensive lens having a great numerical aperture as a projection lens, the reduction of device size and cost can be achieved more easily than the related art four-color-modulating spatial-pixel-arrangement type projector (i.e. single-plate-schemed spatial-pixel-arrangement type projector that is to form a projection image by use of a four-color-modulating spatial-color-separation LV capable of modulating four colors of light). Specifically, exemplary aspects of the present invention can realize a projector that is high in light utilization efficiency and excellent in projection-image brightness increase, device size reduction and cost reduction.

Compared particularly in detail with the four-color-modulating spatial-pixel-arrangement type projector having the similar structure to the present exemplary embodiment, the use of the first and second two-color-modulating spatial-color-separation LV 31, 32 can increase the Z-directional size of the sub-pixel 316A1, 316A2 (in the direction of directional separation of incident color light) two times greater as compared to that of the related art four-color-modulating spatial-color-separation LV provided that the dimensions of the sub-pixels 316A1, 316A2 are equal in Y direction. In case the sub-pixels 316A1, 316A2 are greater in size, the unit macro-lens 331A arranged forward thereof can be taken comparatively long in its focal length. Thus, the maximum focus angle $\alpha_o$ based on the micro-lens can be decreased to decrease the maximum divergence angle $\alpha$ of a luminous flux (see FIG. 4) exiting the first and second two-color-modulating spatial-color-separation LV 31, 32 smaller than the maximum divergence angle $\alpha_o$ at the related art four-color-modulating spatial-color-separation LV ($\alpha<\alpha_o$, see FIG. 4). Furthermore, comparing the related art four-color-modulating spatial-color-separation LV, the light entering the first and second two-color-modulating spatial-color-separation LV 31, 32, because two in kind, is separated in direction at the color separation system 20. Thus, the separation angle $\beta$ (see FIG. 4) of the colors of light, incident at different angles upon the first and second two-color-modulating spatial-color-separation LV 31, 32, can be taken smaller than that of the related art four-color-modulating spatial-color-separation LV ($\beta<\beta_o$).

Accordingly, the projector using two two-color-modulating spatial-color-separation LVs of this exemplary embodiment can reduce the maximum divergence angle of the divergent light exiting the light modulation system 30 relative to the spatial-pixel-arrangement type projector using the related art four-color-modulating spatial-color-separation LV. Accordingly, where increasing the definition for the light modulation system 30 (i.e. liquid-crystal devices 31, 32), there is no need to use an expensive projection lens having a small F number and greater numerical aperture, which makes it possible to make a projection-display of a color image excellent in color balance without lowering the light utilization efficiency. Conversely, in case the maximum divergent angle ($\alpha+\beta$) of the divergent light exiting the first and second two two-color-modulating spatial-color-separation LV 31, 32 is set up equal to that of the four-color-modulating spatial-color-separation LV, the luminous flux entering the sub-pixel 316A1, 316A2 can be decreased in diameter by shortening the focal length of the micro-lens. Thus, it is possible to increase the incident efficiency of color light upon the sub-pixel and to reduce the likelihood or prevent a color mixture from occurring due to the entering of an unwanted color of light to the adjacent other sub-pixel. This makes it possible to projection-display a color image excellent in color expression and free of blotting.

As compared to the four-color-modulating spatial-color-separation LV, the sub-pixels 316A1, 316A2 can be increased in their sizes on the two-color-modulating spatial-color-separation LV 31, 32. This eliminates the necessity to secure a high relative positioning accuracy with the illumination system including the light source 10, the projection lens 60 and the like, thus making it easy to manufacture the projector correspondingly.

Exemplary aspects of the present invention have sub-pixels in a form taking into consideration the form of a focused image by the micro-lens thereby reducing the size of the light valve (spatial-color-separation LV) and enhancing the illumination efficiency. The resulting non-analogous relationship, between a projection image and a light-valve display area, is to be adjusted by the aspect-conversion at the anamorphic projection system. This can provide compatibly in both illumination-efficiency enhancement and light-valve (liquid-crystal device) size reduction. Particularly, in this exemplary embodiment, the sub-pixels corresponding to different colors of light are arranged in a direction of the shorter side of a projection image so that a display region based on the light valve can be approximated to the square in form. Generally, high illumination efficiency is easily obtainable where illuminating an object highly axi-symmetric, such as a square, by a luminous flux highly axi-symmetric. The arrangement of the present exemplary embodiment provides a good match of the illumination luminous flux from the light source 10 with the geometry of the light valve (significantly axi-symmetric), which makes it possible to easily enhance the illumination efficiency to the light valve. The present exemplary embodiment, because the sub-pixels corresponding to the identical color are arranged in a direction parallel with the polarization separation based on the polarization conversion system 70, it is possible to reduce the effect upon the color mixture due to the enlargement of a focused spot image, and hence to realize displaying free of color mixture. Accordingly, the arrangement of an exemplary aspect of the invention can provide compatibly in both light-valve size reduction and higher definition without the reduction of light utilization efficiency or image quality.

Although this exemplary embodiment had sub-pixels in the form of nearly a square, the sub-pixel form is not limited to this, e.g. it can be nearly hexagonal or nearly circular in form. The arrangement of sub-pixels can be in a delta arrangement instead of the stripe arrangement as in the present exemplary embodiment.

Second Exemplary Embodiment

Using FIGS. 10A to 13B, explanation is now made of a second exemplary embodiment of the invention. Note that the member or position similar to that of the first exemplary embodiment is attached with the identical reference, to omit the detailed explanations thereof.

Figures 10A, 10B:
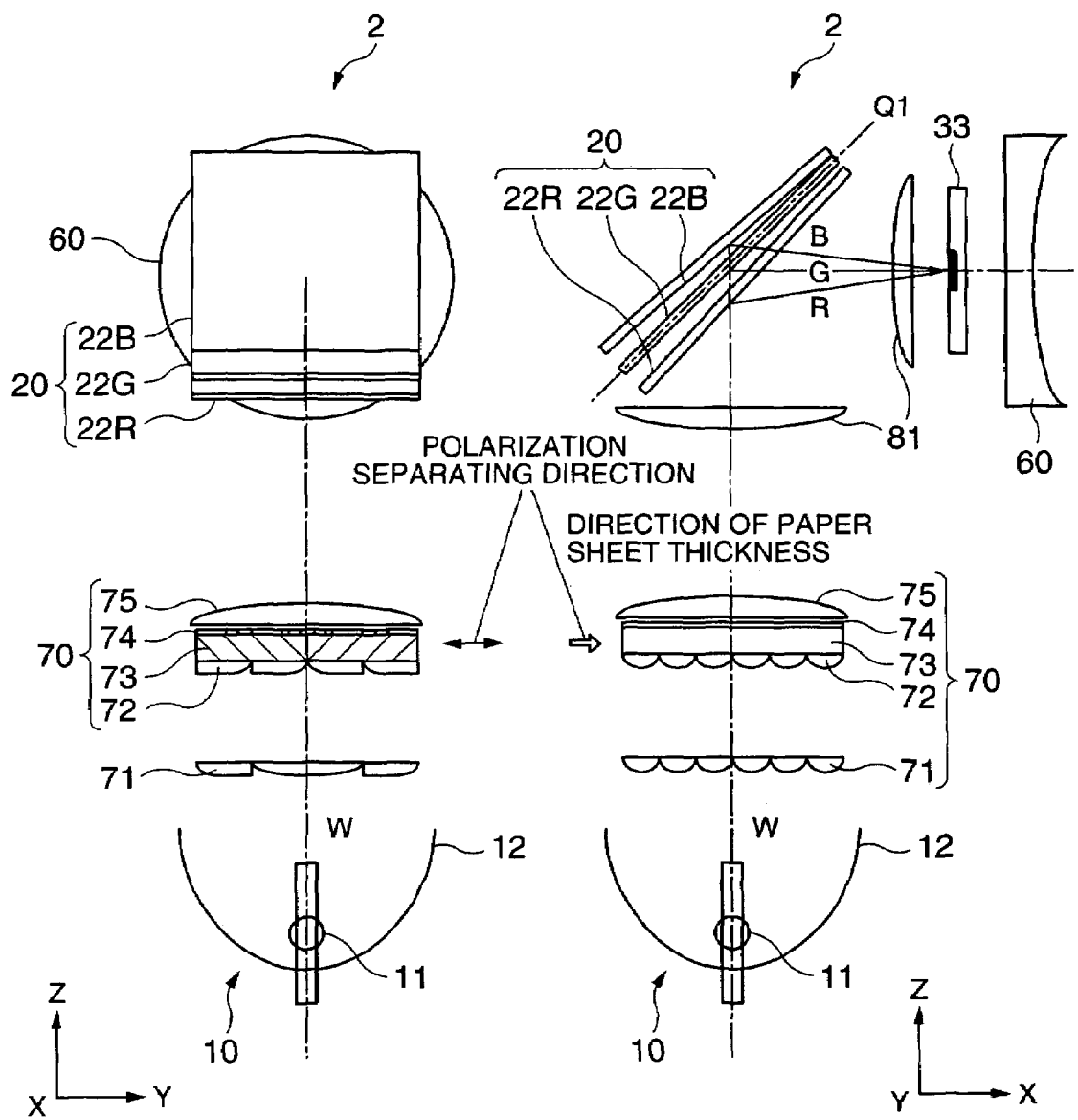
FIGS. 10A and 10B are schematics of a projector according to exemplary embodiment 2 of the invention.

FIGS. 10A and 10B are schematics of the projector according to the present exemplary embodiment. The projector 2 is constructed with a light source 10 to emit light including a visible region of light, a polarization conversion system 70 to convert non-polarized light emitted from the light source 10 into light aligned in polarization direction, a color separation system 20 to separate the light of from the light source 10 into three kinds of colors of light different in wavelength region, a light modulation system 30 to make an optical modulation depending upon external image information and forming optical images (first optical images) color by color, and a projection system 60 to project-display the formed first optical image onto a projection plane (not shown).

The projector 2 of this exemplary embodiment is a single-plate-schemed spatial-pixel-arrangement type projector using a three-color-modulating spatial-color separation light valve (LV). This is similar in basic structure to the projector 1 of the first exemplary embodiment except in that the color separation system 20 separates the light of from the light source 10 into three kinds of color light, i.e. red light (R), green light (G) and blue light (B), in that the light modulation system 30 modulates these three kinds of colors of light, i.e. red light (R), green light (G) and blue light (B), and in that there is no color combining system. Accordingly, explanation is herein made only on the structure of the color separation system 20 and light modulation system 30.

The color separation system 20 has dichroic mirrors 22R, 22G and a reflection mirror 22B. The dichroic mirrors 22R, 22G, in two kinds, are mirrors having a selectivity of wavelength allowing a particular wavelength region of color light to transmit through or to reflect upon the same. The dichroic mirror 22R is a mirror to reflect red light R but allow other colors of light to transmit through the same while the dichroic mirror 22G is a mirror to reflect green light G but allow other colors of light to transmit through the same. The reflection mirror 22B is arranged for the purpose of reflecting toward a predetermined direction the color of light (e.g. blue light B) transmitted the dichroic mirror 22R and dichroic mirror 22G. Accordingly, may be the dichroic mirrors 22R and 22G mirrors for general use but desirably are dichroic mirrors because of the easiness to raise the reflectivity, the easiness to enhance the color purity of illumination light by selectively reflecting only a particular wavelength region of color light.

The dichroic mirror 22R, the dichroic mirror 22G and the reflection mirror 22B are arranged such that the luminous flux emitted from the light source 10 can enter a three-color-modulating spatial-color-separation LV 33, referred to later, at different angles one from another. Specifically, such a virtual axis Q1 is established as assuming 45 degrees relative to the axis of the incident luminous flux on the XZ plane. Two mirrors 22R, 22B are arranged in a non-parallel state with each other about the axis Q1 as a symmetric axis (the spacing between the both is narrowed in the directions of +X and +Z, in FIG. 10B), wherein a dichroic mirror 22G is arranged between the mirrors 22R, 22B and parallel with the axis Q1. This accordingly causes the red light R reflected by the dichroic mirror 22R, the green light G reflected by the dichroic mirror 22G and the blue light B reflected by the reflection mirror 22B, to separately exit in three directions slightly different on the XZ plane.

Figure 11:
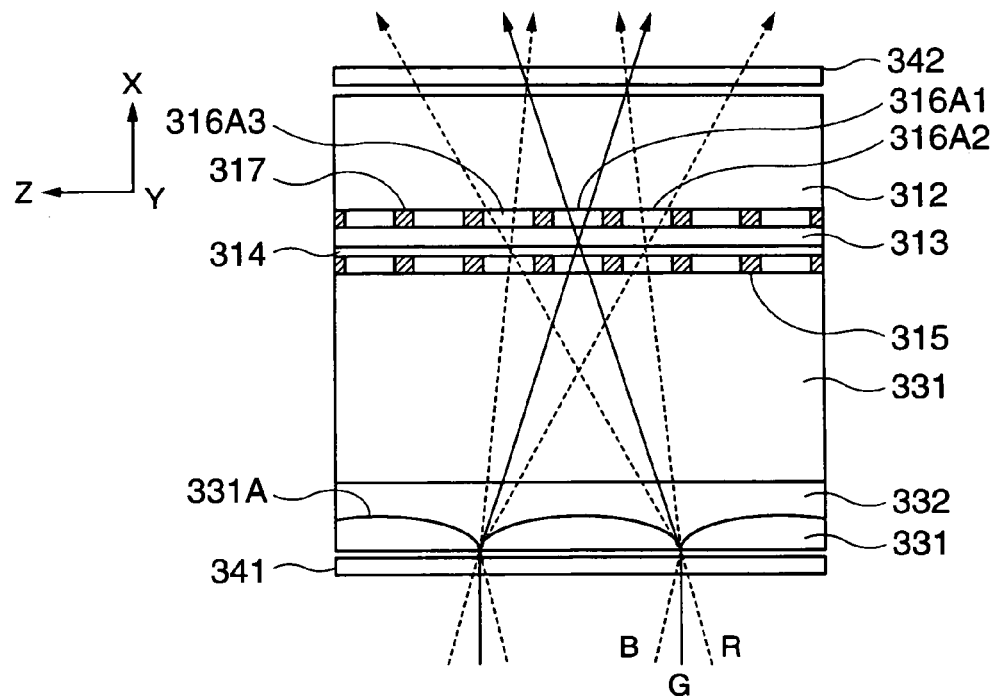
FIG. 11 is a schematic of a light valve.
Figures 12A, 12B:
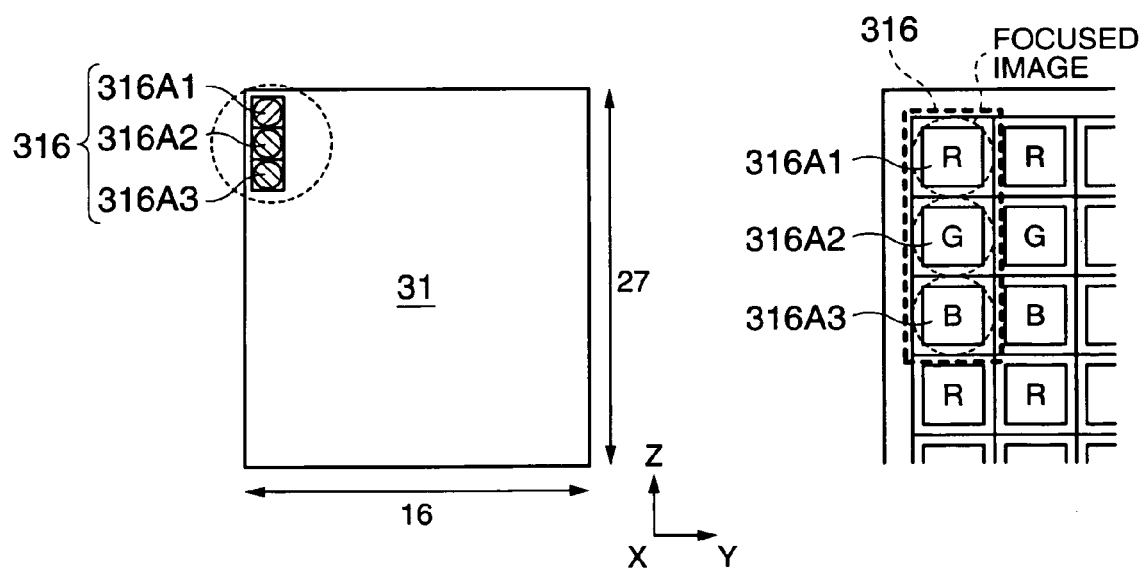
FIGS. 12A and 12B are schematics showing the form of a sub-pixel of the light valve.

The light modulation system 30 has a three-color-modulating spatial-color separation light valve (LV) to modulate the color light separated in traveling direction by the color separation system 20. The three-color-modulating spatial-color-separation LV 33 optically modulates independently the three kinds of incident colors of light depending upon external image information, not shown, and forms optical images (first optical images), thereby causing the modulated luminous fluxes to exit at the end opposite to the incident end. FIGS. 11, 12A and 12B show schematics of the three-color-modulating spatial-color-separation LV of this exemplary embodiment. The three-color-modulating spatial-color-separation LV 33 is generally similar in basic structure to the two-color-modulating spatial-color-separation LV explained in the first exemplary embodiment except in that having three sub-pixels 316A1, 316A2, 316A3 (the sub-pixel is attached with the identical reference to that of the sub-pixel electrode because it signifies a pixel to be driven by a sub-pixel electrode, referred later) within one picture element. Hence, detailed explanations are omitted as to the structure thereof. The sub-pixels 316A1, 316A2, 316A3 correspond to each of the three kinds of colors of light separated by the color separation system 20. One picture element 316 is formed by one set of sub-pixels 316A1, 316A2, 316A3 arranged within the panel. In this exemplary embodiment, the sub-pixels 316A1, 316A2, 316A3 correspond respectively to red light R, green light G and blue light B.

The micro-lens array 331 collects the three kinds of color light separated in the exit direction by the dichroic mirror 22R, dichroic mirror 22G and reflection mirror 22B, and causes them in a spatially separated state to enter the opposed sub-pixels 316A1, 316A2, 316A3, respectively. Specifically, the micro-lens array 331 is structured such that one unit micro-lends 331A corresponds to one set of sub-pixels 316A1, 316A2, 316A3 lined in the Z direction. For this reason, sub-pixels 316A1, 316A2 in one set is set up in a line in a direction the color light is separated in its exit direction by the dichroic mirror 22R, the dichroic mirror 22G and the reflection mirror 22B (in the direction on the XZ plane in FIGS. 10A and 10B). Here, the Z-directional width of the unit micro-lens 331A is set up nearly equal to the sum of a Z-directional width of the sub-pixel 316A1, a Z-directional width of the sub-pixel 316A2 and a Z-directional width of the sub-pixel 316A3. The Y-directional length of the same is set up nearly equal to a Y-directional length of the sub-pixel 316A1, 316A2, 316A3 (the three sub-pixels are equal in Y-directional length one to another). Although the three sub-pixels 316A1, 316A2, 316A3 are set up nearly equal in Z-directional width, this is not limitative. Those may be provided different in width in a manner matched with the focus characteristic of the color light entering the sub-pixels (e.g. focused spot size).

Because the illumination light exiting from the light source 10 has an angular distribution symmetric about the axis, the focused light image (focused spot image sectional form) group formed by the micro-lenses 331A of the three-color-modulating spatial-color-separation LV 33 is nearly circular. Accordingly, in order to efficiently pass the luminous flux through the sub-pixels 316A1, 316A2, 316A3, the present exemplary embodiment has sub-pixels 316A1, 316A2, 316A3 set up nearly square in their openings. In this exemplary embodiment, in order to make the three-color-modulating spatial-color-separation LV 33 compact in structure, the sub-pixels corresponding to the mutually different colors of light are arranged set up in a direction vertical to a projection image horizontally long in the Y direction (i.e. in a direction of the shorter side of a projection image having a rectangular form (in the Z-direction)). With this structure, in case the sub-pixel itself is provided nearly square due to the nearly squared opening, the resulting display area is given a rectangular form having a dimensional vertical-to-horizontal ratio of 27:16 for a three-color-modulating spatial-color-separation LV 33 having a pixel (picture element) count vertical-to-horizontal ratio of 9:16.

Because the present exemplary embodiment is arranged with the polarization conversion system 70 between the light modulation system 30 and the light source 10, there is a somewhat spread of illumination-light angular distribution in the direction of polarization separation. The focused image group formed by the micro-lenses 331A is provided elliptic somewhat longer in that direction. For this reason, the opening of sub-pixel 316A1, 316A2, 316A3 is desirably made somewhat long horizontally (broader width in the Y direction in FIG. 11) corresponding to the spread direction to thereby enhance the light-incident efficiency upon the opening. With such a form of opening, the display area of the three-color-modulating spatial-color-separation LV 33 has a vertical-to-horizontal ratio approximate to a nearly square form instead of the foregoing rectangular of 27:16. Thus, matching is enhanced between the (highly axisymmetric) illumination-light luminous flux of from the light source 10 and the light-valve geometry. This makes it easy to enhance the illumination efficiency to the three-color-modulating spatial-color-separation LV 33. In a case providing a structure to arrange the sub-pixels corresponding to the same color of light in the direction the focused image group is to spread (in the Y direction in FIG. 11) and to arrange the sub-pixels 316A1, 316A2, 316A3 corresponding to different colors of light in the direction orthogonal to the spread of the focused image group (in the Z direction in FIG. 11), it is possible to reduce the fear that non-corresponding colors of light (e.g. red light R and blue light B) enter the sub-pixel (e.g. sub-pixel 316A1 for green) thereby causing a color mixture and the resulting deterioration of image quality. Accordingly, where arranging, on an illumination light path, an optical system having a characteristic to spread the angular distribution of illumination light, e.g. polarization conversion system, it is desired to set up a positional relationship of the optical system and the three-color-modulating spatial-color-separation LV 33 such that the spread direction of angular distribution is coincident with the arrangement direction of the sub-pixels corresponding to the same color of light.

The present exemplary embodiment is provided with collimator lenses 80, 81 forward or backward of the dichroic mirror 22R, 22G and reflection mirror 22B so that the polarized luminous fluxes exited the superimposing lens 75 can be collected relative to the axis thereof and caused to enter, in a nearly collimated state, the color separation system 20 and three-color-modulating spatial-color-separation LV 33. Due to those, color separation accuracy and efficiency are enhanced at the color separation system 20 and light utilization efficiency enhancement and further color mixture reduction (image quality enhancement) are achieved at the three-color-modulating spatial-color-separation LV 33.

In the present exemplary embodiment arrangement shown in FIG. 10, the non-polarized luminous fluxes emitted from the light source 10 are aligned in the polarization direction, e.g. into S-polarization light, by the polarization conversion system 70, to enter the color separation system 20. The luminous flux entering the color separation system 20 is separated as red light R, green light G and blue light B by the dichroic mirror 22R, and then the red light R enters directly the three-color-modulating spatial-color-separation LV 33. The green light G and blue light B, transmitted to the dichroic mirror 22R, is separated as green light G and blue light B by the dichroic mirror 22G. Thereafter, the green light G enters the three-color-modulating spatial-color-separation LV 33 while the blue light B passes the reflection mirror 22B and then enters the three-color-modulating spatial-color-separation LV 33.

The red light R, the green light G and the blue light B, separated in the exit direction by the dichroic mirrors 22R, 22G and reflection mirror 22B, are incident at different angles upon the unit micro-lens 331A on the three-color-modulating spatial-color-separation LV 33, as shown in FIG. 11. The red light R, the green light G and the blue light B, entering the unit micro-lens 331A, exit, at mutually different angles, the unit micro-lens 331A, to be collected color by color respectively to vicinities of one set of sub-pixels 316A1, 316A2, 316A3 lined in the z direction. The red light R, the green light G and the blue light B are modulated by the respective sub-pixels 316A1, 316A2, 316A3, to exit at angles nearly mutually symmetric about the direction (X direction in FIG. 11) orthogonal to the luminous-flux incident end surface of the three-color-modulating spatial-color-separation LV 33. On this occasion, because the present exemplary embodiment made the sub-pixel 316A1, 316A2, 316A3 in such a form nearly square that can necessarily and fully include the focused image formed by the micro-lens 331A, it is possible to reduce the likelihood or prevent against a color mixture at the adjacent sub-pixels 316A1, 316A2, 316A3 while realizing a high illumination efficiency (see FIGS. 12A and 12B).

Figures 13A, 13B:
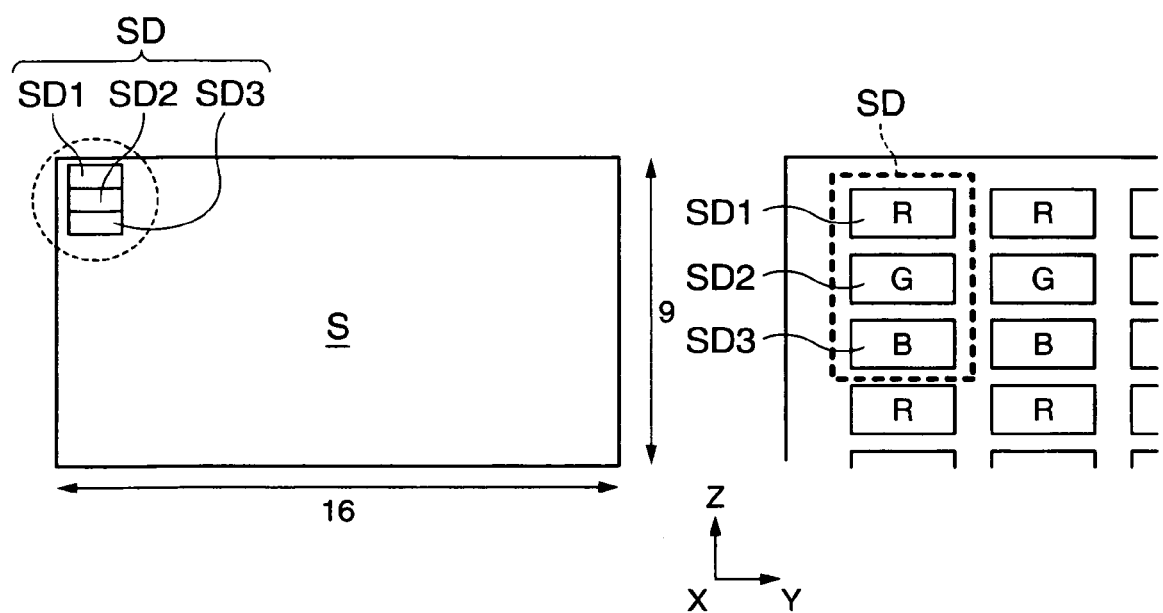
FIGS. 13A and 13B are schematics showing the form of an optical image projected on the screen.
Figure 14A:
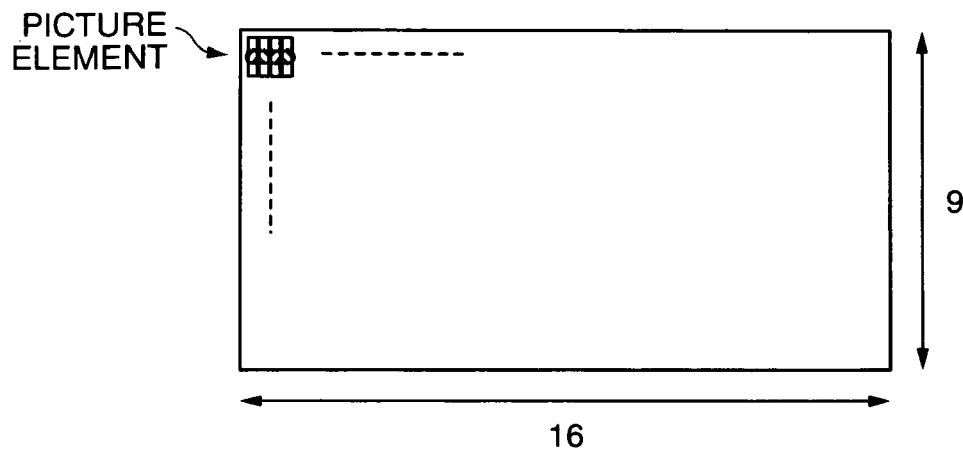
FIGS. 14A and 14B are schematics showing the form of a sub-pixel of a related art spatial-pixel-arrangement type projector.
Figure 14B:
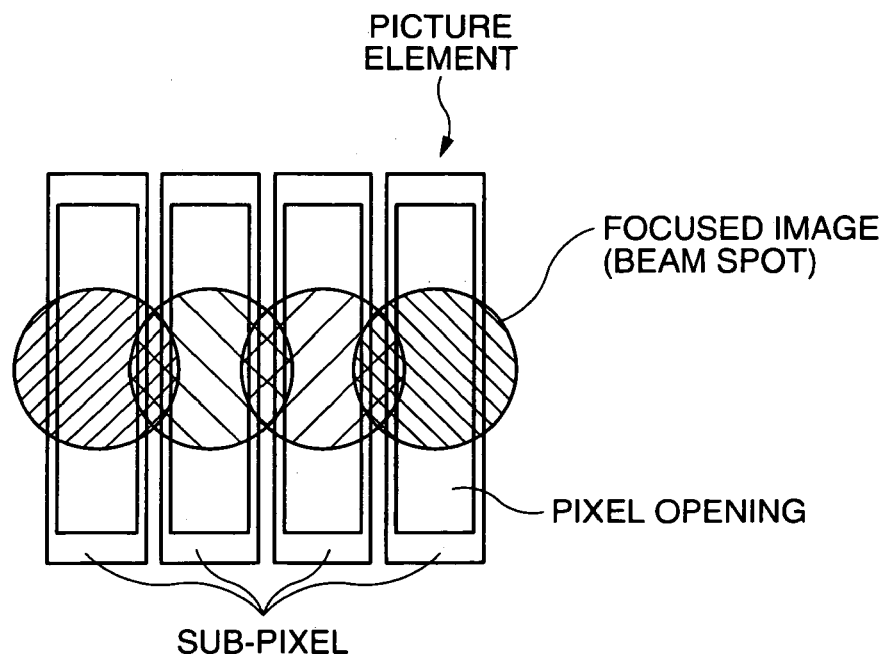

The optical image formed by the three-color-modulating spatial-color-separation LV 33 (the optical image has a vertical-to-horizontal ratio of 27:16) is magnified by the anamorphic projection system 60 while being converted to a vertical-to-horizontal ratio of 9:16, thus being projected to the screen S. There is shown in FIGS. 13A and 13B a form of an optical image projected on the screen S. In this process, the first optical images 316D1, 316D2, 316D3, nearly square in form based on the sub-pixels 316A1, 316A2, 316A3 shown in FIG. 12B, are respectively converted into second optical images SD1, SD2, SD3 rectangular in form having a vertical-to-horizontal ratio of 1:3 shown in FIGS. 13A and 13B. Due to this, the rectangular first optical image 316D based on the picture element 316 is converted into a second optical image nearly square. Therefore, the present exemplary embodiment, despite having the rectangular picture elements 316, finally aspect-converts the first optical image by the anamorphic projection system 60 thereby making it possible to display a projection image free of unsuitableness formed by the second optical image SD nearly square in form (see FIGS. 13A and 13B).

As explained so far, the present exemplary embodiment also has sub-pixel openings made in such a dimensional form that can necessarily and fully include the focused image formed by the micro-lens 331A (specifically, nearly square), thus enabling to realize a projector small in size and excellent in light utilization efficiency.

Although the exemplary embodiments of the invention were so far explained while referring to the attached drawings, the invention naturally is not limited to those examples. For example, the first exemplary embodiment carried out optical modulation by use of the two two-color-modulating spatial-color-separation LVs. Alternatively, four kinds of color light may be modulated independently by using a three-color-modulating spatial-color-separation LV explained in the second exemplary embodiment and a usual monochromatic LV (however, the pixel form, etc. is required to be made corresponding to the three-color-modulating spatial-color-separation LV). In this case, there is no special restrictions in how to assign a plurality of colors of light (wavelength regions) to the three-color-modulating spatial-color-separation LV and usual monochromatic LV. For example, red light R can be assigned to the monochromatic LV while shorter-wavelength green light G1, longer-wavelength green light G2 and blue light B to the three-color-modulating spatial-color-separation LV, or otherwise shorter-wavelength green light G1 can be assigned to the monochromatic LV while red light R, longer-wavelength green light G2 and blue light B to the three-color-modulating spatial-color-separation LV. In case providing a structure assigning the color light smaller in intensity to the monochromatic LV, intensity balance is to be easily taken with other colors of light, which is effective in broadening the display color range. It is natural that there is a need to properly modify the color separation system structure correspondingly to the combination of the three-color-modulating spatial-color-separation LV and the monochromatic LV. Although the foregoing exemplary embodiment used the TN-type liquid-crystal device as a light valve thereof, it can use another form, such as ferroelectric type, antiferroelectric type, horizontally-aligned type, vertically-aligned type or PDLC type, in place thereof. The light valve can use an electro-optical device other than liquid-crystal devices. The number of colors used can be two or five or more without limited to the foregoing. Furthermore, the forms, combinations, etc. of the constituent members shown in the above examples are mere one examples and hence can be modified in various ways based on design requirements, etc. within the scope not departing from the scope of the invention.

What is claimed is:

1. A projector, comprising:
   a light source to emit light containing a visible region of light;
   a color separation system to separate a luminous flux emitted from the light source into a plurality of kinds of colors of light different in exit direction;
   a light modulation system to modulate the plurality of kinds of colors of light separated at the color separation system and forming first optical images; and
   an anamorphic projection system to convert the first optical images formed at the light modulation system into second optical images having a desired aspect ratio thereby projecting same;
   the light modulation system including a light valve including a plurality of sub-pixels provided corresponding to the plurality of kinds of colors of light separated at the color separation system and micro-lenses to collect the plurality of kinds of separated colors of light and allowing the plurality of kinds of separated colors of light to exit to corresponding ones of the sub-pixels, the sub-pixels being formed in a form to include the color of light focused on the sub-pixel by the micro-lens; and
   the color separation system being structured to separate a luminous flux emitted from the light source into four kinds of colors of light, the light modulation system including a first light valve to modulate any two kinds of colors of light of among the four kinds of color of light separated by the color separation system, and a second light valve to modulate other two kinds of colors of light, a color combining system being provided between the light modulation system and the anamorphic projection system that combines together the four kinds of colors of light modulated by the first light valve and second light valve.

2. The projector according to claim 1, a plurality of sub-pixels corresponding to different colors of light from one another being arranged in one direction, the plurality of sub-pixels having an arrangement direction established in a direction of a shorter side of a projection image having a rectangular form.

3. The projector according to claim 1, the sub-pixels or an opening form of the sub-pixels being in a rectangular form having a longer side in a direction in which an angular distribution of illumination light spreads.

4. The projector according to claim 1, the light valve including a display area in a form of nearly a square.

5. The projector according to claim 1, the color combining system including a dichroic plane, a polarization rotating element to rotate a polarization direction of light by 90 degrees being provided on an incident side or an exit side of any one of the first and second light valves such that colors of light reflected upon and combined at the dichroic plane assume S-polarized light while colors of light transmitted through and combined together at the dichroic plane assume P-polarized light.

6. The projector according to claim 1, the plurality of colors of light separated by the color separation system being blue light, shorter-wavelength green light, longer-wavelength green light and red light.

7. The projector according to claim 6, the shorter-wavelength green light and the longer-wavelength green light including a boundary wavelength set at approximately 515 nm to 540 nm.

8. A projector, comprising:
   a light source to emit light containing a visible region of light;
   a color separation system to separate a luminous flux emitted from the light source into a plurality of kinds of colors of light different in exit direction;
   a light modulation system to modulate the plurality of kinds of colors of light separated at the color separation system and forming first optical images; and an anamorphic projection system to convert the first optical images formed at the light modulation system into second optical images having a desired aspect ratio thereby projecting same;

the light modulation system including a light valve including a plurality of sub-pixels provided corresponding to the plurality of kinds of colors of light separated at the color separation system and micro-lenses to collect the plurality of kinds of separated colors of light and allowing the plurality of kinds of separated colors of light to exit to corresponding ones of the sub-pixels, the sub-pixels being formed in a form to include the color of light focused on the sub-pixel by the micro-lens; and the color separation system being structured to separate a luminous flux emitted from the light source into four kinds of colors of light, the light modulation system including a first light valve to modulate any three kinds of colors of light of among the four kinds of color of light separated by the color separation system, and a second light valve to modulate other one kind of color of light, a color combining system being provided between the light modulation system and the anamorphic projection system that is to combine together the four kinds of colors of light modulated by the first light valve and second light valve.

9. The projector according to claim 8, a plurality of sub-pixels corresponding to different colors of light from one another being arranged in one direction, the plurality of sub-pixels having an arrangement direction established in a direction of a shorter side of a projection image having a rectangular form.

10. The projector according to claim 8, the sub-pixels or an opening form of the sub-pixels being in a rectangular form having a longer side in a direction in which an angular distribution of illumination light spreads.

11. The projector according to claim 8, the light valve including a display area in a form of nearly a square.

12. The projector according to claim 8, the color of light to be modulated at the second light valve being a color of light smallest in light intensity of among colors of light emitted from the light source.

13. The projector according to claim 8, the color combining system including a dichroic plane, a polarization rotating element to rotate a polarization direction of light by 90 degrees being provided on an incident side or an exit side of any one of the first and second light valves such that colors of light reflected upon and combined at the dichroic plane assume S-polarized light while colors of light transmitted through and combined together at the dichroic plane assume P-polarized light.

14. The projector according to claim 8, the plurality of colors of light separated by the color separation system being blue light, shorter-wavelength green light, longer-wavelength green light and red light.

15. The projector according to claim 14, the shorter-wavelength green light and the longer-wavelength green light including a boundary wavelength set at approximately 515 nm to 540 nm.

* * * * *